USOO5558340A

United States Patent [19]

Ibe et al.

[11] Patent Number: 5,558,340
[45] Date of Patent: Sep. 24, 1996

[54] GAME MACHINE

[75] Inventors: Takaya Ibe; Kazuyoshi Tanaka; Kaname Ota; Goujun Yamamoto; Toshihiro Okabe, all of Tokyo, Japan

[73] Assignee: Kabushiki Kaisha Banpresto, Japan

[21] Appl. No.: 514,269

[22] Filed: Aug. 11, 1995

[30]   Foreign Application Priority Data

Aug. 21, 1994 [JP] Japan .................................. 6-219480
Jun. 30, 1995 [JP] Japan .................................. 7-187774

[51] Int. Cl.⁶ ...................................................... A63F 9/00
[52] U.S. Cl. ............................................. 273/448; 221/87
[58] Field of Search ..................................... 273/440, 447, 273/448; 221/210–220, 87

[56]                References Cited

U.S. PATENT DOCUMENTS

| 4,111,418 | 9/1978 | DeMent, Jr. ....................... 273/447 X |
| 5,271,628 | 12/1993 | Okada .................................. 273/448 |
| 5,368,310 | 11/1994 | Ogata et al. ........................... 273/448 |
| 5,415,417 | 5/1995 | Reis, Jr. ................................ 273/447 |

FOREIGN PATENT DOCUMENTS

| 2700045 | 7/1994 | France ..................................... 221/87 |
| 2114457 | 8/1983 | United Kingdom .................. 273/448 |

*Primary Examiner*—Paul E. Shapiro
*Attorney, Agent, or Firm*—Graham & James LLP

[57]                ABSTRACT

A game machine includes a housing; a grip mechanism including two hands for gripping articles mounted on a rear wall of the housing; a drive mechanism for moving the grip mechanism vertically and/or horizontally, and depthwise in the housing; a control mechanism for controlling starting and stopping of the drive mechanism; and an input mechanism manually controlled by a game user for sending signals to the control mechanism to start and stop vertical and/or horizontal movement of the grip mechanism. Depthwise movement of the grip mechanism is actuated by the control mechanism after horizontal and vertical movement is stopped. A sensor mechanism on the grip mechanism senses the presence of a prize between the two hands and sends a signal to the control mechanism to close the hands to grip the article whereupon the grip mechanism is returned to a home position, the hands are released and the prize is delivered to the user.

20 Claims, 24 Drawing Sheets

GAME MACHINE

BACKGROUND OF THE INVENTION

1. Field of the Invention

The present invention relates to a game machine and, more particularly, to a catcher game machine capable of finding the most suitable application in a business game machine to be used in a game center or the like.

2. Prior Art

There has heretofore been a catcher game machine for business use, in which dolls, candies or other premium goods are provided within a machine body so that a user can enjoy lifting such premiums. Especially in recent years, the premium dolls are so increasingly popular that the catcher game machine is one of the most attractive game machines in the game centers.

A known catcher machine is equipped, as disclosed in Japanese Utility Model Publication No. 26950/1974, with a bottom face upon which the premiums are placed, a carriage for moving in a horizontal plane over the bottom face, and a pair of pawl members (or grip means) suspended from the carriage by a wire rope.

When the carriage is moved to a desired position by input means disposed in the body of the catcher gate machine of this kind, the wire rope is automatically extended to bring the paired pawl members, which are in a open position, to the bottom face. As soon as the open pawl members drop to the bottom face, the wire rope is winched to close the pawl members and lift the same to its initial position. When the pawl members are completely lifted, the carriage automatically resumes its initial position. The paired pawl members are opened again at the restored initial position of the carriage. If a premium is being gripped, it is dropped into its outlet so that the user can take out the premium from the outlet.

As described above, however, the existing catcher game machine is generally characterized by lifting the premium placed on the bottom face by the paired pawl members. In this business field, there has been a desire to develop a novel catcher game machine having a different structure.

SUMMARY OF THE INVENTION

The present invention has been conceived in view of the problems described above and has a first object to provide a novel game machine in which grip means is moved in a vertical direction, a horizontal direction or a depthwise direction to grip a premium disposed at the deep side in the machine body.

The present invention has a second object to provide a game machine in which the grip means is prevented from pushing the premiums onto the deep wall but can take them out one by one.

A third object of the present invention is to provide a game machine in which the grip means can be prevented from being broken even if it impinges upon the wall or other obstacles while moving forward.

In order to achieve the above-specified first object, there is provided a first embodiment of the game machine, which include: (a) a machine body; (b) grip means disposed at this side in the machine body for gripping an article disposed at the deep side; (c) drive means for moving the grip means, the drive means including: vertical drive means for moving the grip means in a vertical direction; or horizontal drive means for moving the grip means in a horizontal direction; and depthwise drive means for moving the grip means in a depthwise direction; (d) control means disposed in the machine body for controlling the actuation/stop of the drive means; and input means for sending signals to the control means to actuate/stop the vertical drive means or the horizontal drive means, (e) wherein the control means actuates the depthwise drive means, after the horizontal drive means or the vertical drive means is stopped, to move the grip means toward the article.

In a second embodiment, the game machine includes: (a) a machine body; (b) grip means disposed at this side in the machine body for gripping an article disposed at the deep side; (c) drive means for moving the grip means, the drive means including: vertical drive means for moving the grip means in a vertical direction; horizontal drive means for moving the grip means in a horizontal direction; and depthwise drive means for moving the grip means in a depthwise direction; (d) control means disposed in the machine body for controlling the actuation/stop of the drive means; and input means for sending signals to the control means to actuate/stop the vertical drive means and the horizontal drive means, (e) wherein the control means actuates the depthwise drive means, after the horizontal drive means and the vertical drive means are stopped, to move the grip means toward the article.

In a third embodiment, the grip means can also include: a pair of hands; hand drive means for opening/closing the paired hands; and sensor means for detecting the entrance of the article into between the paired hands, whereby when the sensor means detects the entrance of the article into between the paired hands, it sends its detection signal to the control means so that the control means actuates the hand drive means to close the paired hands.

In a fourth embodiment, the grip means can also include: a pair of hands; hand drive means for opening/closing the paired hands; and sensor means for detecting the entrance of the article into between the paired hands, whereby when the sensor means detects the entrance of the article into between the paired hands, it sends its detection signal to the control means so that the control means stops the actuation of the horizontal drive means and actuates the hand drive means to close the paired hands.

In a fifth embodiment, the game machine includes: (a) a machine body; (b)grip means disposed at this side in the machine body for gripping an article disposed at the deep side; (c)drive means for moving the grip means, the drive means including: vertical drive means for moving the grip means from an initial position in a vertical direction; or horizontal drive means for moving the grip means from an initial position in a horizontal direction; and depthwise drive means for moving the grip means in an initial position in a depthwise direction; (d) control means disposed in the machine body for controlling the actuation/stop of the drive means; and input means for sending signals to the control means to actuate/stop the vertical drive means or the horizontal drive means, (e) wherein the control means actuates the depthwise drive means, after the horizontal drive means or the vertical drive means is stopped, to move the grip means toward the article, (f) wherein the grip means includes: a pair of hands; hand drive means for opening/closing the paired hands; and sensor means for detecting the entrance of the article into between the paired hands, whereby when the sensor means detects the entrance of the article into between the paired hands, it sends its detection signal to the control means so that the control means stops the actuation of the depthwise drive means and actuates the hand drive means to close the paired hands, and (g) wherein the control means actuates, with the paired hands being closed, the drive means to return the grip means to the initial position and actuates the hand drive means to open the paired hands.

In a sixth embodiment, the game machine includes: (a) a machine body; (b) grip means disposed at this side in the machine body for gripping an article disposed at the deep side; (c) drive means for moving the grip means, the drive means including: vertical drive means for moving the grip means from an initial position in a vertical direction; horizontal drive means for moving the grip means from an initial position in a horizontal direction; and depthwise drive means for moving the grip means in an initial position in a depthwise direction; (d) control means disposed in the machine body for controlling the actuation/stop of the drive means; and input means for sending signals to the control means to actuate/stop the vertical drive means and the horizontal drive means, (e) wherein the control means actuates the depthwise drive means, after the horizontal drive means and the vertical drive means are stopped, to move the grip means toward the article, (f) wherein the grip means includes: a pair of hands; hand drive means for opening/closing the paired hands; and sensor means for detecting the entrance of the article into between the paired hands, whereby when the sensor means detects the entrance of the article into between the paired hands, it sends its detection signal to the control means so that the control means stops the actuation of the depthwise drive means and actuates the hand drive means to close the paired hands, and (g) wherein the control means actuates, with the paired hands being closed, the drive means to return the grip means to the initial position and actuates the hand drive means to open the paired hands.

In a seventh embodiment, the game machine can further comprise: bias means for biasing the grip means forward while attaching the same to the front portion of the horizontal drive means such that the grip means can freely move in the horizontal direction; and sensor means disposed on the depthwise drive means or the grip means for detecting the backward movement, if any, of the grip means against the elasticity of the bias means, while the grip means is being moved toward the article by the actuation of the depthwise drive means, to send a signal to the control means thereby to stop the actuation of the depthwise drive means.

Thanks to the aforementioned construction of the game machine according to the first embodiment, when the input means is operated, the vertical drive means or the horizontal drive means is actuated to move the grip means at a side(e.g., a front side) in the machine body in the vertical direction or the horizontal direction. When the input means is operated to stop the actuation of the vertical drive means or the horizontal drive means, the grip means is fixed in a predetermined position. The control means actuates the depthwise drive means to move the grip means toward the article disposed in the deep side in the machine body.

Thanks to the aforementioned construction of the game machine according to the second embodiment, when the input means is operated, the vertical drive means and the horizontal drive means are actuated to move the grip means at front side in the machine body in the vertical direction and the horizontal direction. When the input means is operated to stop the actuation of the vertical drive means and the horizontal drive means, the grip means is fixed in a predetermined position. The control means actuates the depthwise drive means to move the grip means toward the article disposed in the deep side in the machine body.

Thanks to the aforementioned construction of the game machine according to the third embodiment, when the article enters the gap between the paired hands of the grip means moving toward the article, this entrance is detected by the sensor means. The detection signal of this sensor means is sent to the control means. This control means actuates the hand drive means to close the paired hands, thereby to grip the article.

Thanks to the aforementioned construction of the game machine according to the fourth embodiment, when the article enters the gap between the paired hands of the grip means moving toward the article, this entrance is detected by the sensor means. The detection signal of this sensor means is sent to the control means. This control means stops the actuation of the depthwise drive means and actuates the hand drive means to close the paired hands thereby to grip the article.

Thanks to the aforementioned construction of the game machine according to the fifth embodiment, when the input means is operated, the vertical drive means or the horizontal drive means is actuated to move the grip means in the vertical direction or in the horizontal direction from an initial position. When the input means is operated to stop the actuation of the vertical drive means or the horizontal drive means, the grip means is fixed in the predetermined position. The control means actuates the depthwise drive means to move the grip means toward the article disposed at the deep side in the machine body. When the article enters the gap between the paired hands of the grip means moving toward the article, this entrance is detected by the sensor means. The detection signal of this sensor means is sent to the control means. This control means stops the actuation of the depthwise drive means and actuates the hand drive means to close the paired hands, thereby to grip the article. The control means actuates, with the paired hands being closed, the drive means to return the grip means to the initial position and drive the hand drive means to open the paired hands thereby to drop the article.

Thanks to the aforementioned construction of the game machine according to the sixth embodiment, when the input means is operated, the vertical drive means and the horizontal drive means are actuated to move the grip means at a side (such as the front side in the machine body) in the machine body from the initial position in the vertical direction and in the horizontal direction. When the input means is operated to stop the actuations of the vertical drive means and the horizontal drive means, the grip means is fixed in the predetermined position. The control means actuates the depthwise drive means to move the grip means toward the article disposed at the deep side in the machine body. When the article enters the gap between the paired hands of the grip means moving toward the article, this entrance is detected by the sensor means. The detection signal of this sensor means is sent to the control means. This control means stops the actuation of the depthwise drive means and actuates the hand drive means to close the paired hands thereby to grip the article. The control means actuates, with the paired hands being closed, the drive means to return the grip means to the initial position and drive the hand drive means to open the paired hands thereby to drop the article.

In the game machine according to the sixth embodiment, if the grip means moving toward the article impinges upon the deep wall or other obstacles, it cannot move any farther so that it is returned relative to the depthwise drive means. This backward movement of the grip means relative to the elasticity of the bias means or elastic member is detected by sensor means. The detection signal of this sensor means is sent to a control means. This control means stops the actuation of the depthwise drive means. The grip means is

DESCRIPTION OF THE PREFERRED EMBODIMENTS

One embodiment of a game machine 1000 according to the present invention will be described with reference to FIGS. 1 to 7.

Figure 1:
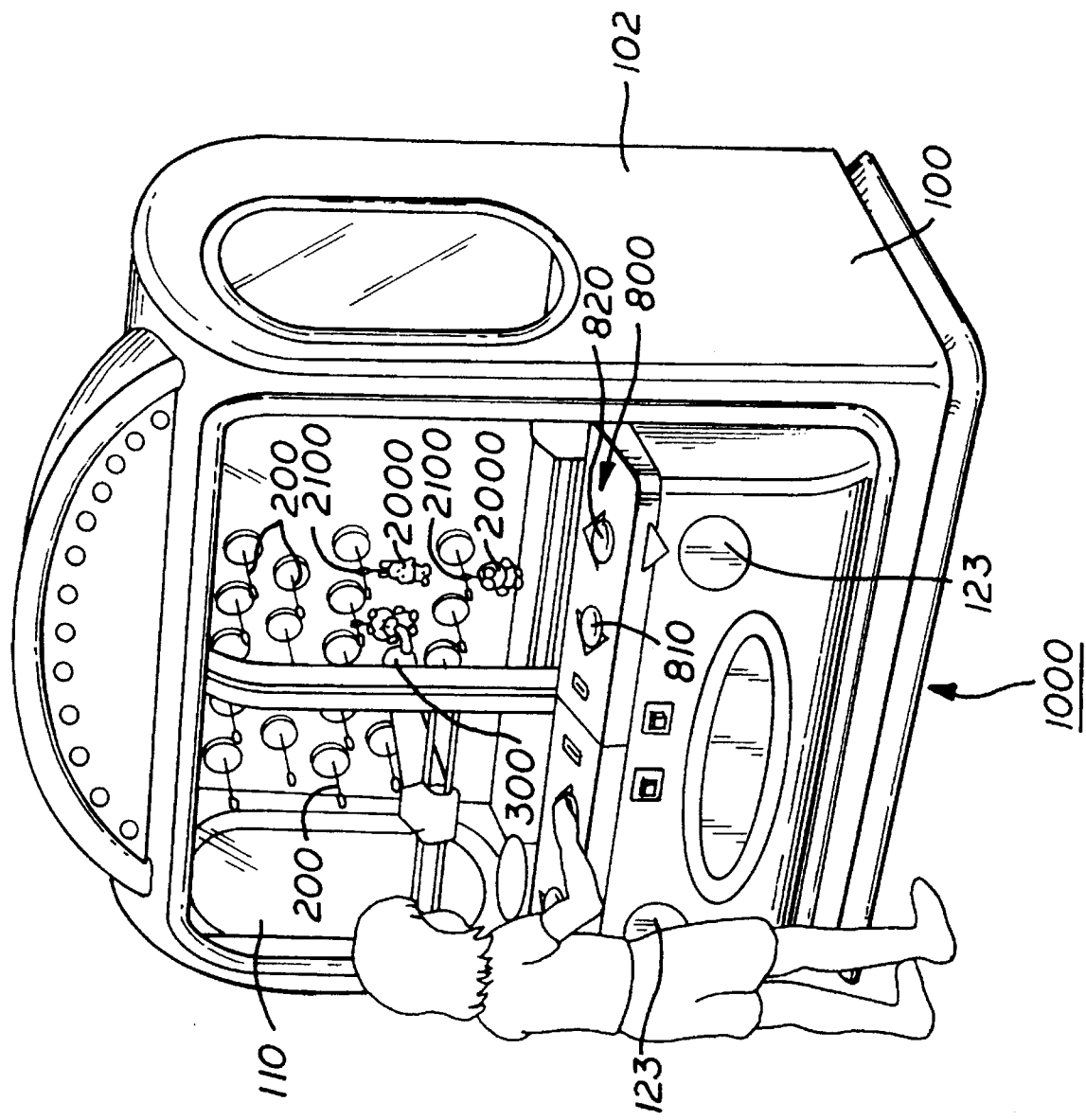
FIG. 1 is a perspective view of the game machine according to one embodiment of the present invention.
Figure 2:
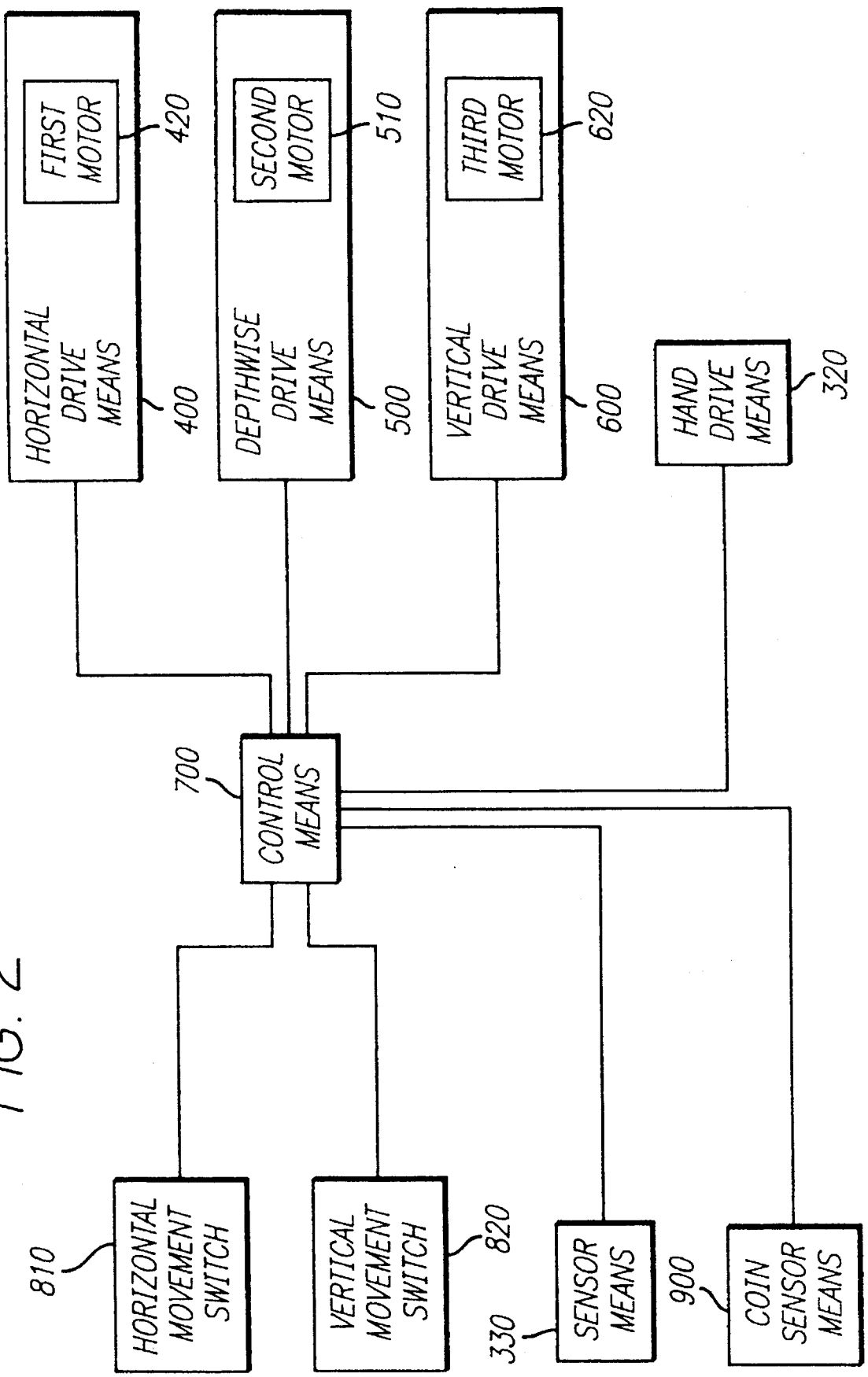
FIG. 2 is a block diagram of an electric construction of the game machine of the embodiment.

As shown in FIGS. 1 and 2, the game machine 1000 of the present embodiment is constructed to comprise: a machine body 100; a plurality of holder means 200 disposed on the deep wall face in the machine body 100 for suspending therefrom a key holder (i.e., an article to be gripped) 2000; grip means 300 disposed at this side in the machine body 100 for gripping the key holder 2000; drive means for moving the grip means 300; control means 700 for controlling the drive of the drive means; and input means 800 for inputting instructions of the user.

This drive means is constructed to include: horizontal drive means 400 for moving the grip means 300 from an initial position in an X-direction (or horizontal direction); depthwise drive means 500 for moving the grip means 300 from an initial position in a Z-direction (or depthwise direction); and vertical drive means 600 for moving the grip means 300 from an initial direction in a Y-direction (or vertical direction).

The machine body 100 is equipped on its front face with a glass plate 110 for allowing the user to recognize therethrough the key holder 2000 and the grip means 300 in the machine body 100.

The game machine 1000 of the present embodiment is equipped therein with two parallel game machines so that two users can play them simultaneously. Incidentally, the arrangement of the game machines should not be limited to the two parallel ones but can be modified to a single one or three or more parallel ones.

The key holder 2000 corresponds to an article to be gripped and adopts a suitable design but has to be such one as can be suspended by the holder means 200 through a ring 2100 or the like.

The holder means 200 is provided for suspending the key holder 2000 and is exemplified in the present embodiment by a rod member which is depthwise fixed. This holder means 200 suspends a suitable number of key holders 2000.

The grip means 300 is provided for gripping the key holder 2000 and is constructed to include: a pair of hands 310; hand drive means 320 for opening/closing the hands 310; and sensor means 330 for detecting that a key holder 2000 comes in between the paired hands 310.

These paired hands 310 are provided for gripping the key holder 2000. The hand drive means 320 is provided for opening/closing the hands 310 to grip or drop the key holder 2000. The hand drive means 320 of the present embodiment is biased by the elastic righting force of an elastic member (not shown) to urge the hands 310 in the closing direction and is constructed to such a cam in contact with the hands 310 as is turned by a motor or the like to open the hands 310 against the elastic righting force of the elastic member.

Incidentally, the hand drive means 320 should not be limited to the aforementioned construction of the embodiment but can adopt any mechanism if it can open/close the hands 310.

The sensor means 330 is provided for detecting the entrance of the key holder 2000 into the paired hands 310 and is exemplified in the present embodiment by a transmission type interrupter. Incidentally, the sensor means 330 should not be limited to the transmission type interrupter but can adopt any sensor such as a photo-sensor or contact sensor if it can detect the key holder 2000. Incidentally, the sensor means 330 may be disposed in any position of the grip means 300 if it can detect the key holder 2000.

Figure 3:
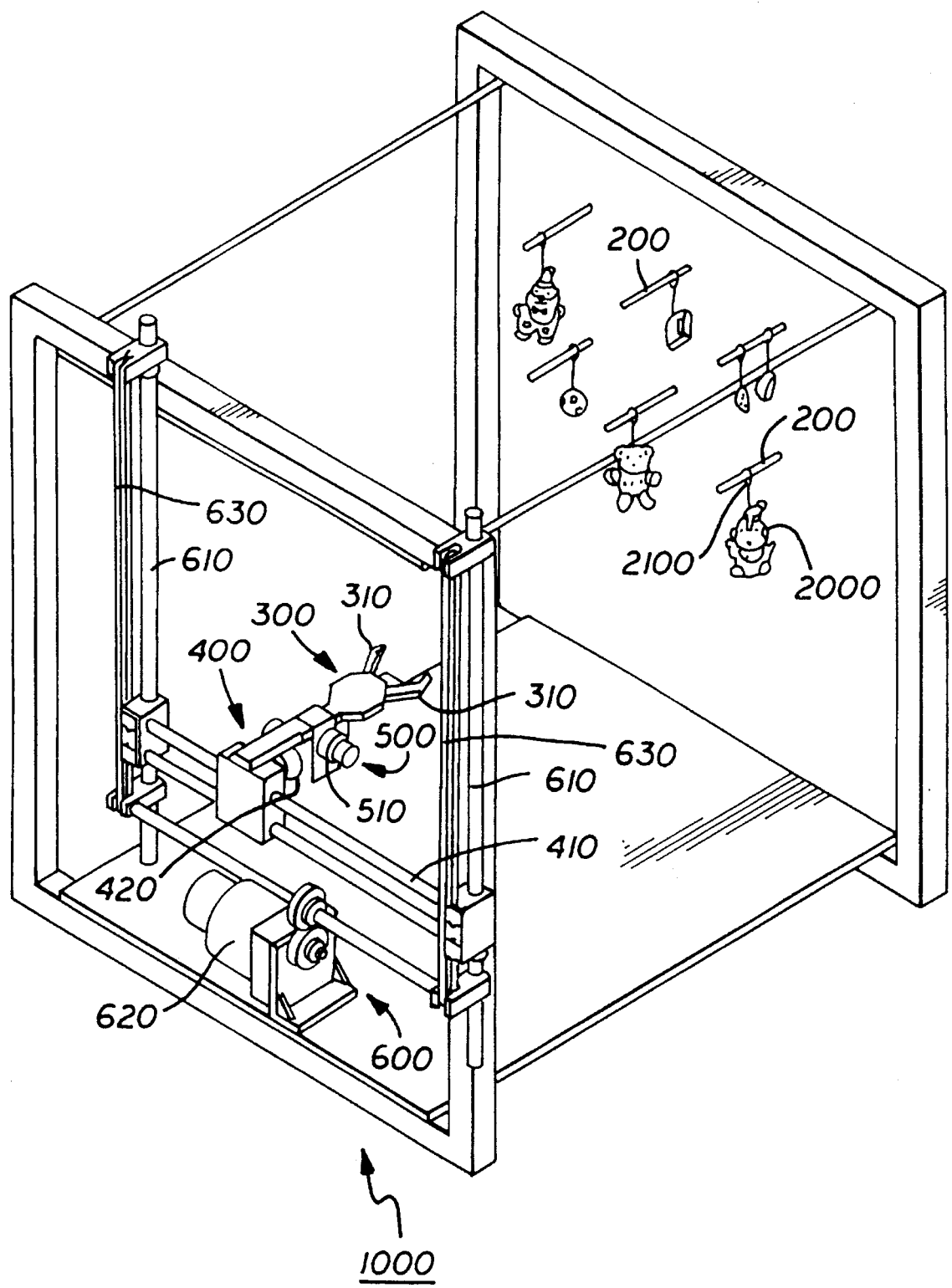
FIG. 3 is a view of a drive mechanism of the embodiment.

The horizontal drive means 400 is provided for moving the grip means 300 in an X-direction (or horizontal direction), from an initial position, and is constructed in the present embodiment to move horizontal rails 410 in the horizontal direction (or X-direction) by the driving force of a first motor 420, as shown in FIG. 3. Incidentally, the horizontal drive means 400 can adopt any mechanism if it can move the grip means 300 in the X-direction.

The depthwise drive means 500 is provided for moving the grip means 300 in a Z-direction (or depthwise direction), from an initial position, and is constructed in the present embodiment to actuate a suitable slide mechanism by a second motor 510 thereby to move the grip means 300 in the depthwise direction, as shown in FIG. 3. Incidentally, depthwise drive means 500 can adopt any slide mechanism if it can move the grip means 300 in the Z-direction.

The vertical drive means 600 is provided for moving the grip means 300 in the Y-direction (or vertical direction), from an initial position and is constructed in the present embodiment to move the horizontal rails 410 carrying the grip means 300 vertically along the vertical rails 610 so that it can transmit the driving force of a third motor 620 to the horizontal rails 410 through belts 630 thereby to move the grip means 300 in the vertical direction. Incidentally, the vertical drive means 600 can adopt any slide mechanism if it can move the grip means 300 in the Y-direction.

The control means 700 is provided for controlling the horizontal drive means 400, the depthwise drive means 500 and the vertical drive means 600. In response to a control signal from the input means 800, the control means 700 actuates the horizontal drive means 400 and the vertical drive means 600 to move the grip means 300 from the initial position to a position in an X-Y plane, as desired by the user. Moreover, the control means 700 actuates the depthwise drive means 500 to move the grip means 300 in the depthwise direction (or Z-direction) and to stop the movement in response to a control signal of the sensor means 330. Moreover, the control means 700 actuates the hand drive means 320 to close the hands 310 and then actuates the horizontal drive means 400, the vertical drive means 600 and the depthwise drive means 500 to return the grip means 300 to the initial position and the hand drive means 320 to open the hands 310.

The input means 800 is provided for inputting the user's instructions and is constructed to include a horizontal movement switch 810 and a vertical movement switch 820.

The horizontal movement switch 810 is provided for driving the horizontal drive means 400. In response to the depression of the horizontal movement switch 810 by the user, in the present embodiment, the control means 700 can actuate the horizontal drive means 400 to fix the grip means 300 in a desired position in the X-direction.

The vertical movement switch 820 is provided for driving the vertical drive means 600. In response to the depression of the vertical movement switch 820, in the present embodiment, the control means 700 can actuate the vertical drive means 600 to fix the grip means 300 in a desired position in the Y-direction.

The actions of the present embodiment thus constructed will be described with reference to FIGS. 1 to 4.

First of all, the user inserts a coin through a coin slot into the machine body 100. Then, coin sensor means 900 detects the presence of the coin and sends a game start signal to the control means 700 to start the game. Incidentally, the coin sensor means 900 can be modified to accept a prepaid or similar card.

The user starts the game by selecting a desired key holder 2000 suspended from the holder means 200 and tries to obtain the desired key holder 2000 by the use of the grip means 300.

First of all, the horizontal movement switch 810 is depressed to move the grip means 300 in the horizontal direction (or X-direction) and is released to fix the X-coordinate of the grip means 300 when the grip means 300 reaches a position where the desired key holder 2000 is present.

Then, the vertical movement switch 820 is depressed to move the grip means 300 in the vertical direction (or Y-direction) and is released to fix the Y-coordinate of the grip means 300 when the grip means 300 reaches a position where the desired key holder 2000 is present.

Alternatively, the horizontal movement switch 810 may be operated after the vertical movement switch 820 is operated. Moreover, the grip means 300 can be intermittently moved by modifying the construction such that the grip means 300 can be moved only when the horizontal movement switch 810 and the vertical movement switch 820 are depressed.

Since the grip means 300 is thus fixed in position in the X-Y plane, the control means 700 actuates the depthwise drive means 500 to move the grip means 300 in the depthwise direction.

When the sensor means 330 of the grip means 300 detects that the key holder 2000 enters the gap between the paired hands 310, this detection signal is sent to the control means 700 to stop the actuation of the depthwise drive means 500 and to drive the hand drive means 320 to close the hands 310.

Figure 5:
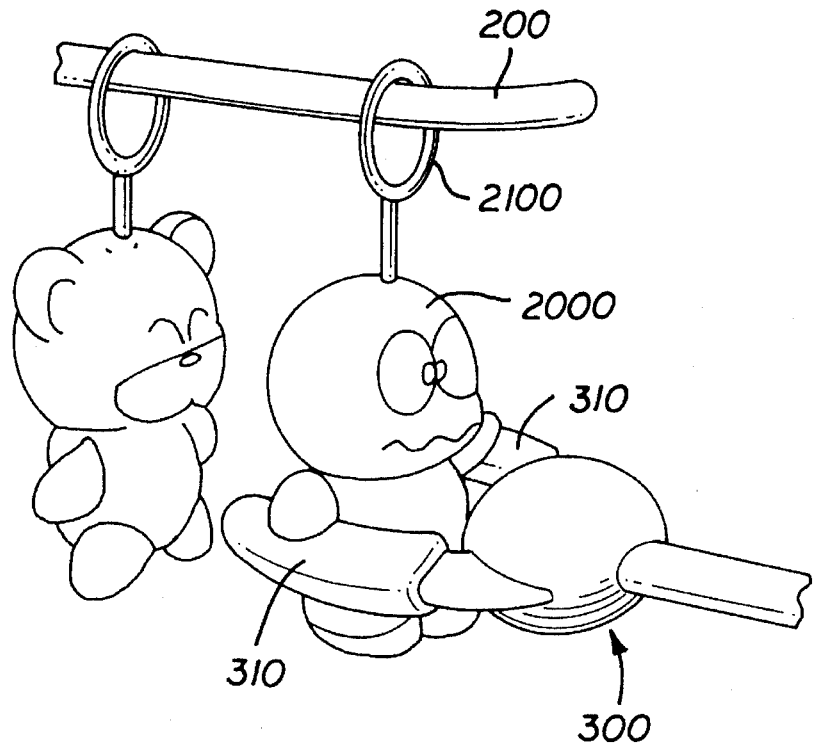
FIG. 5 is a view illustrating the case in which the grip means of the embodiment succeeds in the acquirement of a key holder.

At this time, if the user properly operates the horizontal movement switch 810 and the vertical movement switch 820 so that the grip means 300 is fixed in a correct position in the X-Y plane, then the key holder 2000 can be gripped by the hands 310. Specifically, the trunk of a doll or key holder 2000 can safely gripped, as shown in FIG. 5.

Figure 6:
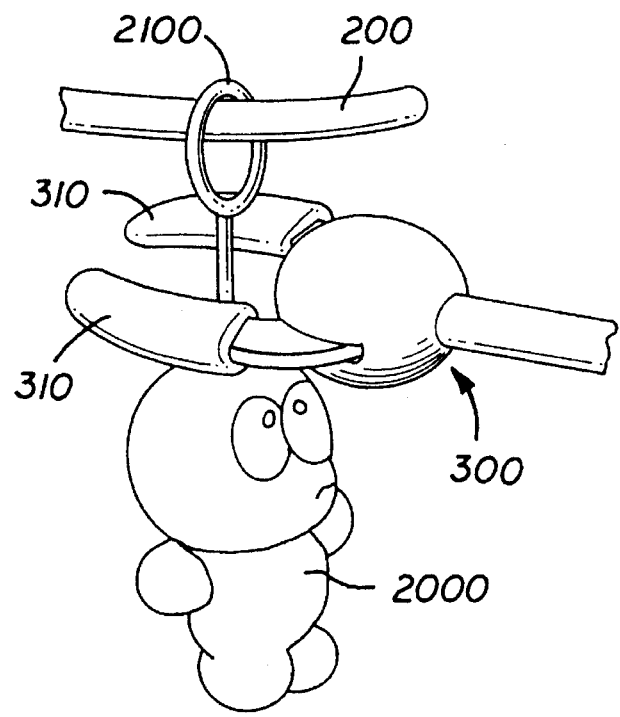
FIG. 6 is a view illustrating the case in which the grip means fails to acquire a key holder.
Figure 7:
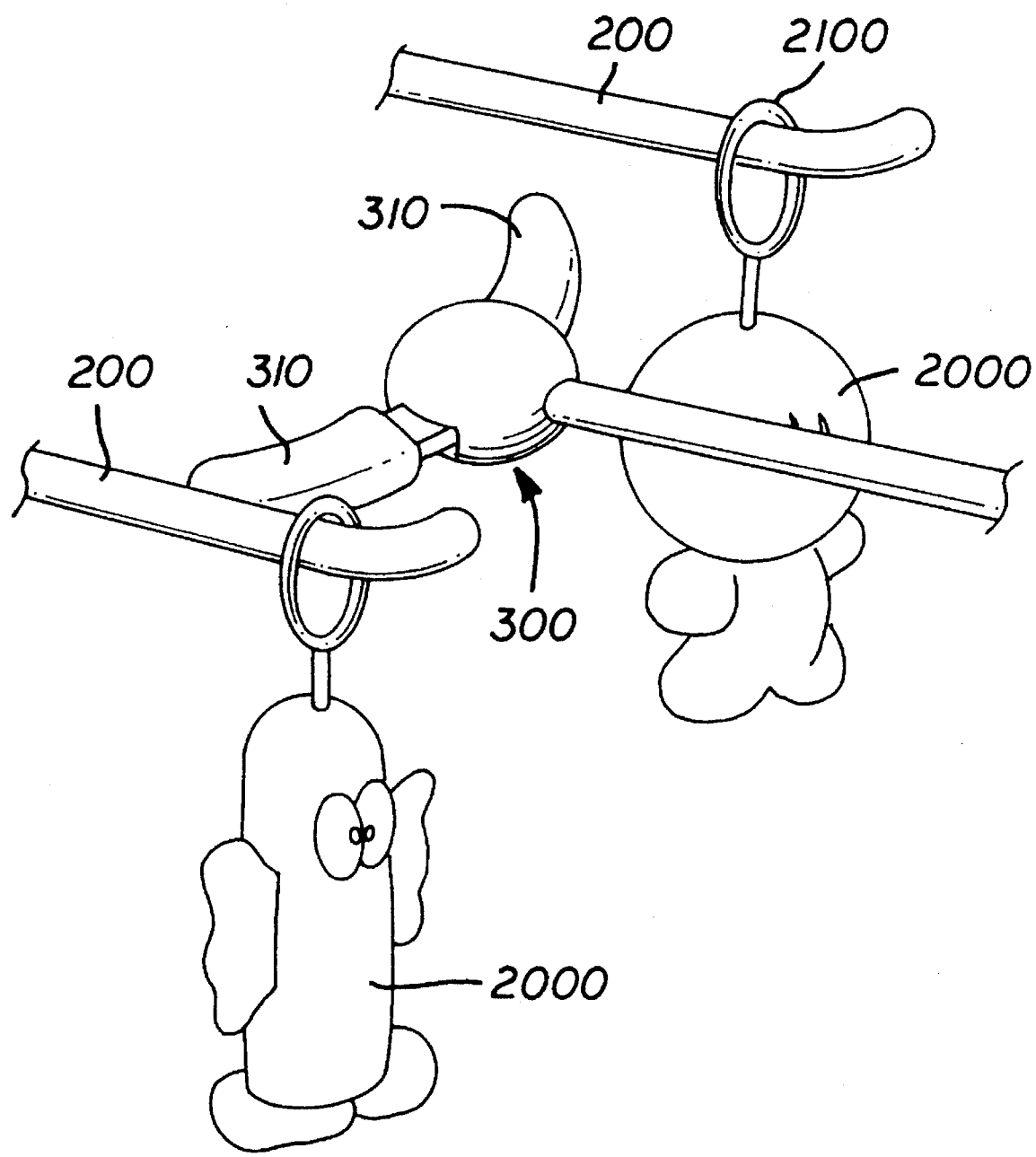
FIG. 7 is a view illustrating the case in which the grip means fails to acquire a key holder.

On the other hand, if the user fails to properly operate the horizontal movement switch 810 and the vertical movement switch 820, the key holder 2000 cannot be gripped by the paired hands 310. As shown in FIG. 6, for example, the trunk of the doll or key holder 2000 cannot be gripped. Moreover, in case the grip means 300 is incorrectly positioned in the X-direction, the key holder 2000 cannot be gripped in the least, as shown in FIG. 7.

Then, the control means 700 controls the horizontal drive means 400, the depthwise drive means 500 and the vertical drive means 600 to return the grip means 300 to the initial position and drives the hand drive means 320 to open the hands 310. In case the key holder 2000 is gripped by the grip means 300, it is dropped. If a suitable outlet opening is formed below the initial position of the machine body 100, the key holder 2000 can be discharged to the outside.

Incidentally, the article to be gripped should not be limited to the key holder 2000 but may be exemplified by amulets, toys, candies or other premiums.

Another embodiment of the game machine 1000 according to the present invention will be described in more detail with reference to FIGS. 8 to 26.

Figure 8:
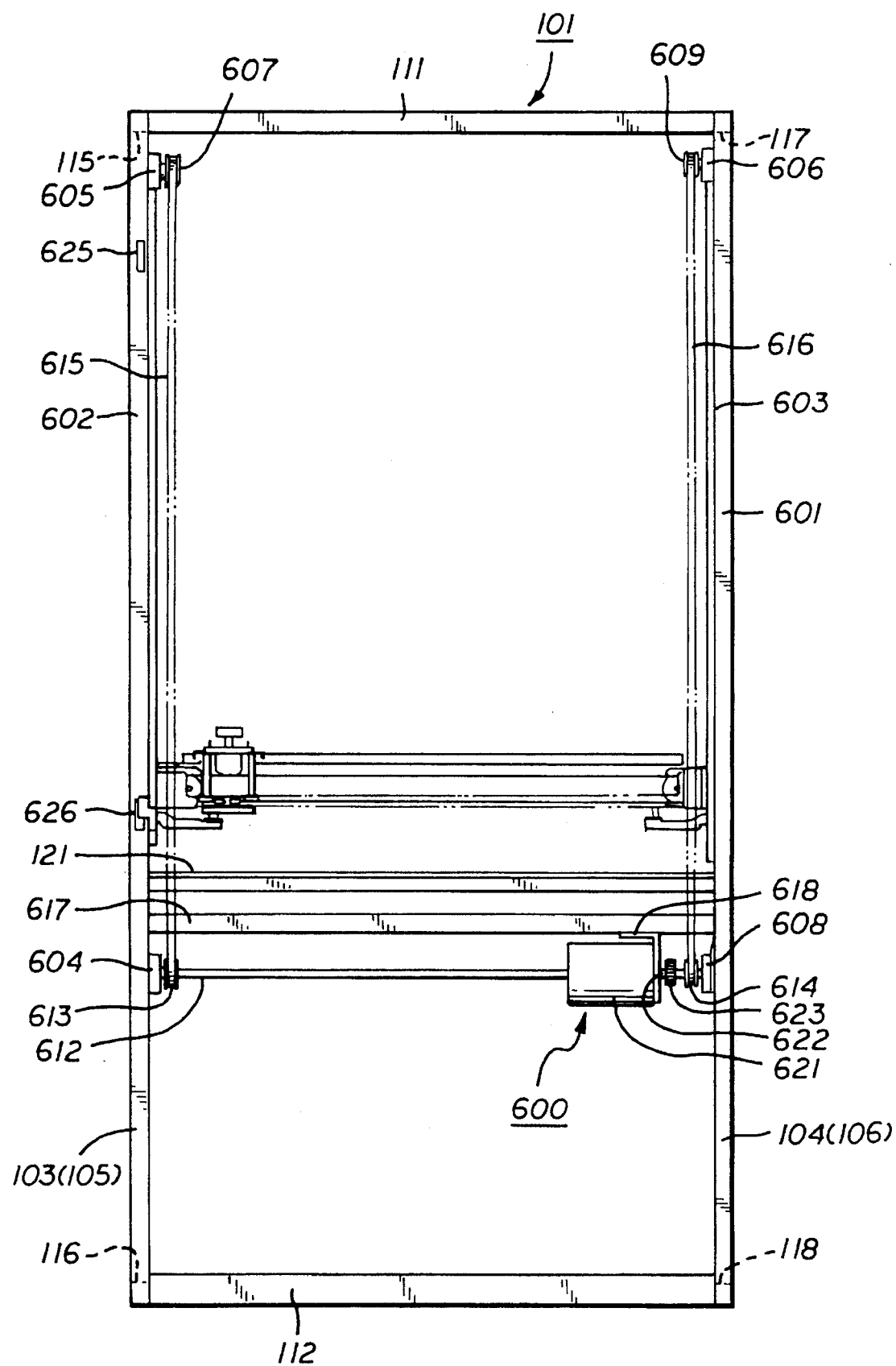
FIG. 8 is a front elevation of a frame according to an embodiment of the present invention.
Figure 9:
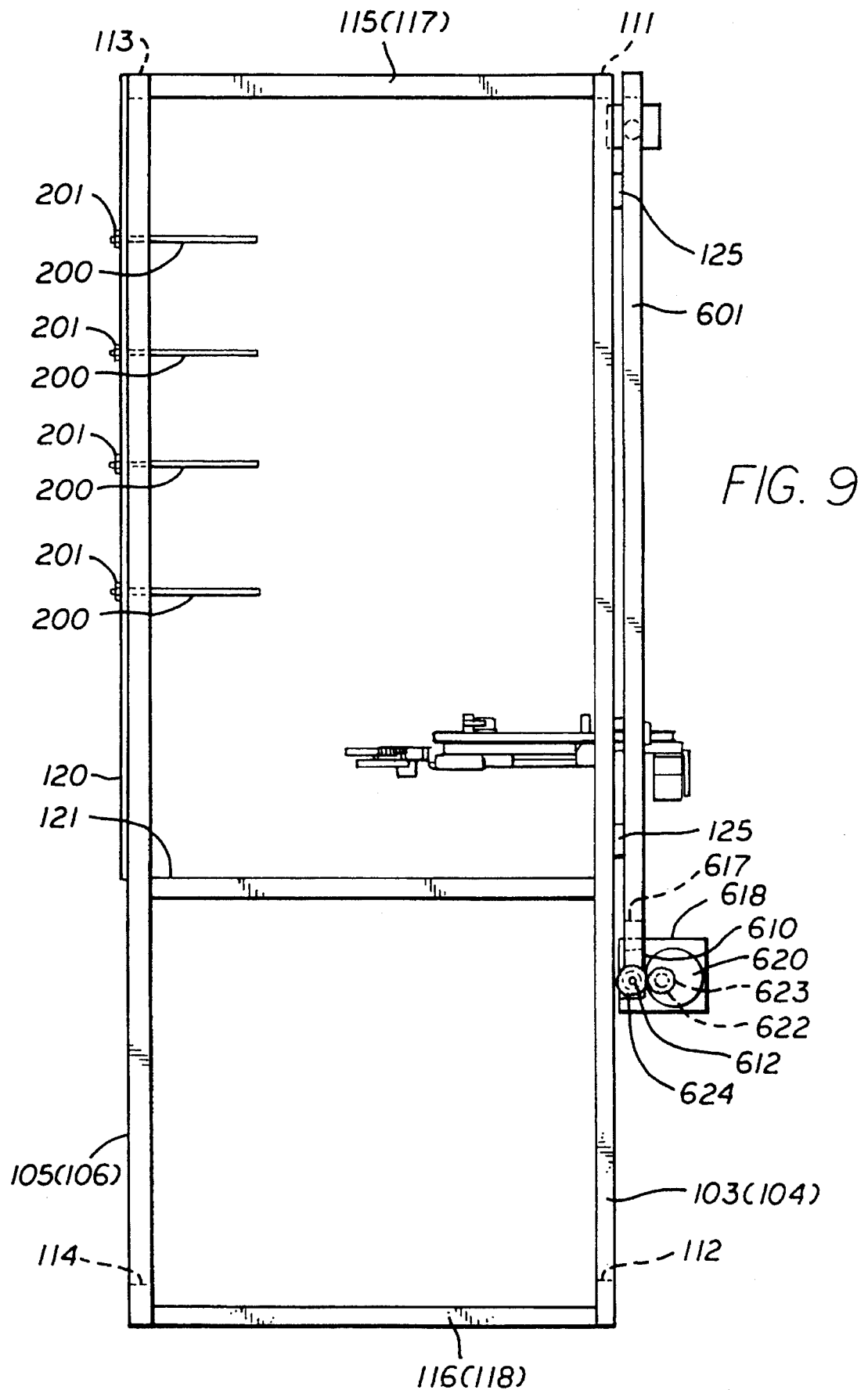
FIG. 9 is a lefthand side elevation of the frame.
Figure 10:
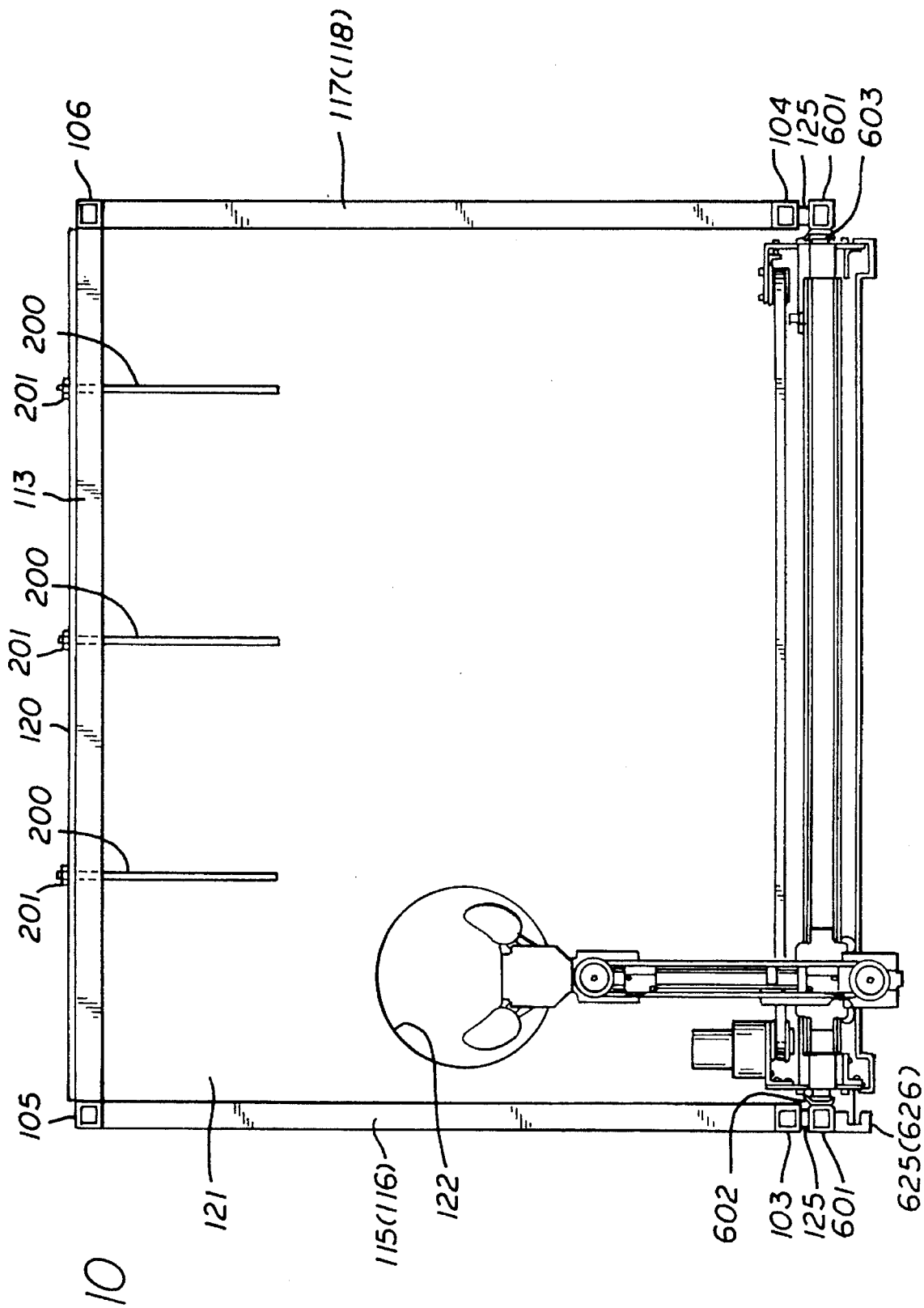
FIG. 10 is a top plan view of the frame.
Figure 11:
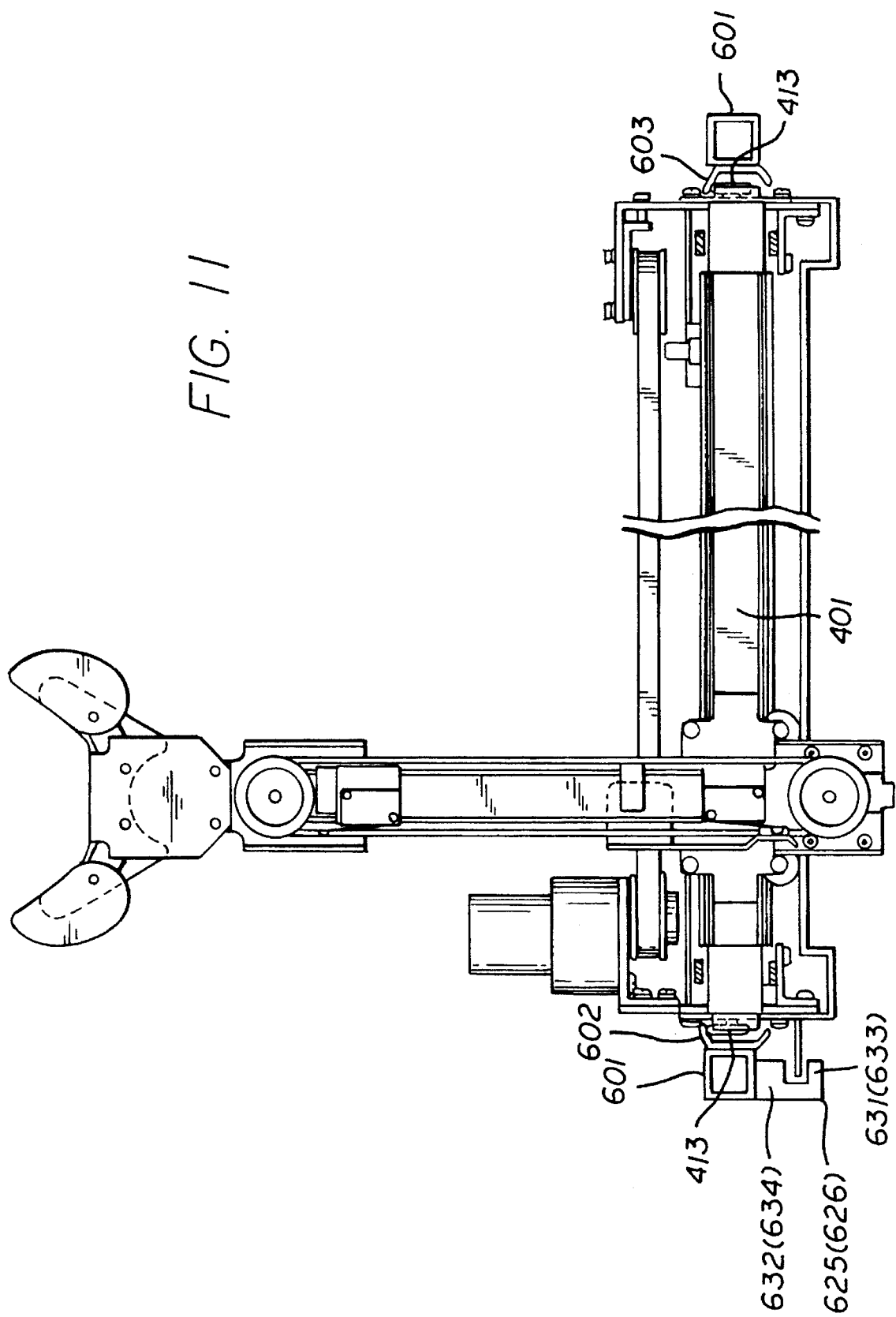
FIG. 11 is an enlarged top plan view of a portion of FIG. 10.

The machine body 100 will be described with reference to FIGS. 8 to 11. FIG. 8 is a front elevation of a later-described frame 101. FIG. 9 is a lefthand side elevation of the frame 101. FIG. 10 is a top plan view of the frame 10. FIG. 11 is an enlarged top plan view of a portion of FIG. 10.

The machine body 100 is constructed to include the frame 101 and a decorative cover member 102 to be attached to the outer side of the frame 101. This decorative cover member 102 is exemplified by one shown in FIG. 1. This decorative cover member 102 is equipped or its front face with the aforementioned glass plate 110. The frame 101 is formed of a lefthand front post 103, a righthand front post 104, a lefthand rear post 105, a righthand rear post 106, joint members 111 and 112 jointing the individual upper and lower ends of the lefthand front post 103 and the righthand front post 104, joint members 113 and 114 joining the individual upper and lower ends of the lefthand rear post 105 and the righthand rear post 106, joint members 116 and 116 joining the individual upper and lower ends of the lefthand front post 103 and the lefthand rear post 105, and joint members 117 and 118 joining the individual upper and lower ends of the righthand front post 104 and the righthand rear post 106.

To the rear portion of the frame 101, namely, to the lefthand rear post 105, the righthand rear post 106 and the joint members 113 and 114, there is attached a rear wall 120. On this rear wall 120, there are fixed by means of nuts 201 the rod-shaped holder means 200 which are protruded inward. On the generally central portion in the frame 101, there is mounted an intermediate wall 121 which defines the inside of the frame 101 vertically. This intermediate wall 121 is formed in its suitable portion with a premium dropping opening 122. This premium dropping opening 122 is given communication with a premium outlet 123 formed in the front face of the decorative cover member 102 by way of a not-shown passage.

The vertical drive means 600 is equipped with generally square-shaped frame members 601 which are mounted on the lefthand front post 103 and the righthand front post 104 by mounting members 125. The frame member 601 is equipped at its two sides with vertical rails 602 and 603 which extend in the vertical direction.

At the two sides of the frame member 601, as located above the vertical rails 602 and 603, there are disposed bearings 605 and 606 on which are rotatably mounted follower belt pulleys 607 and 609. At the two sides of the frame member 601, as located below the vertical rails 602 and 603, there are disposed bearings 604 and 608, between which is rotatably fitted a drive shaft 612. On the two sides of this drive shaft 612, there are fixed drive belt pulleys 613 and 614. An endless toothed belt (or timing belt) 615 is made to run on the drive belt pulley 613 and the follower belt pulley 607 at the lefthand side. An endless toothed belt (or timing belt) 616 is also made to run on the drive belt pulley 614 and the follower belt pulley 609 at the righthand side.

To the vicinity of the generally central portion of the frame member 601, there is fixed an intermediate joint member 617, on which is fixed a drive motor 621 by a generally L-shaped mounting member 618. On the output shaft 622 of the drive motor 621, there is fixed an output gear 623. This output gear 623 is always in meshing engagement with an input gear 624 which is fixed on the drive shaft 612.

At the lefthand side of the frame member 601, as located in the vicinity of the upper end of the vertical rail 602, there is disposed a sensor member 625 which is equipped with a light emitting element 631 and a light receiving element 632. In the vicinity of the lower end of the vertical rail 602, there is disposed a sensor member 626 which is equipped with a light emitting element 633 and a light receiving element 634.

Figure 12:
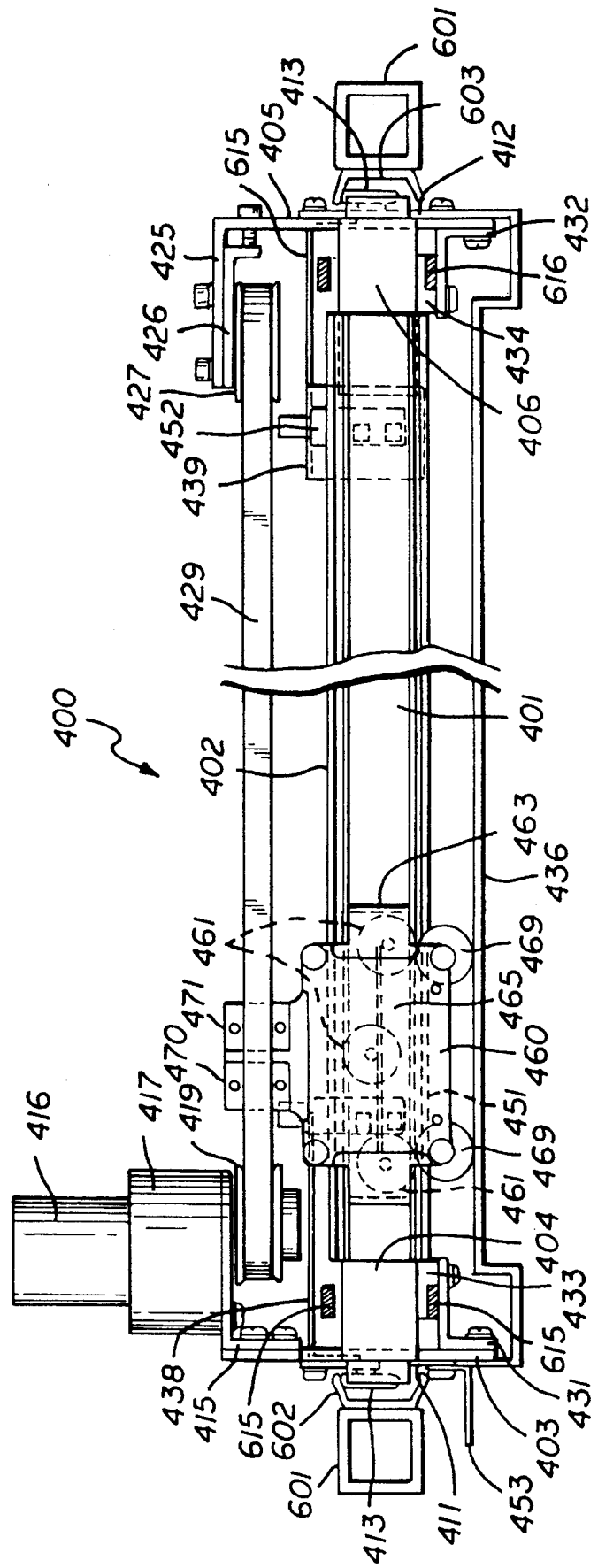
FIG. 12 is a top plan view of horizontal drive means according to another embodiment of the present invention.
Figure 13:
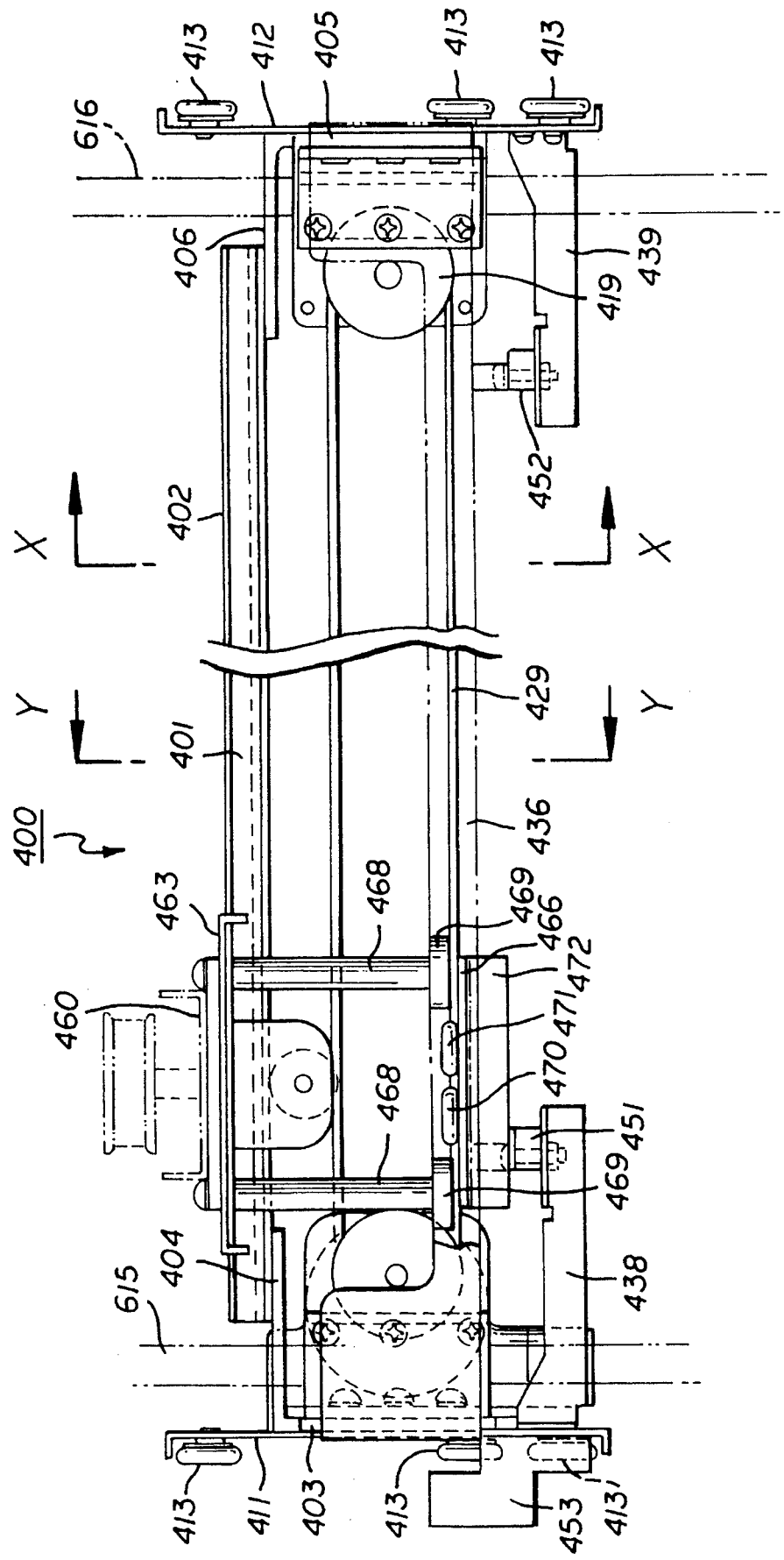
FIG. 13 is a front elevation of the horizontal drive means.
Figure 14:
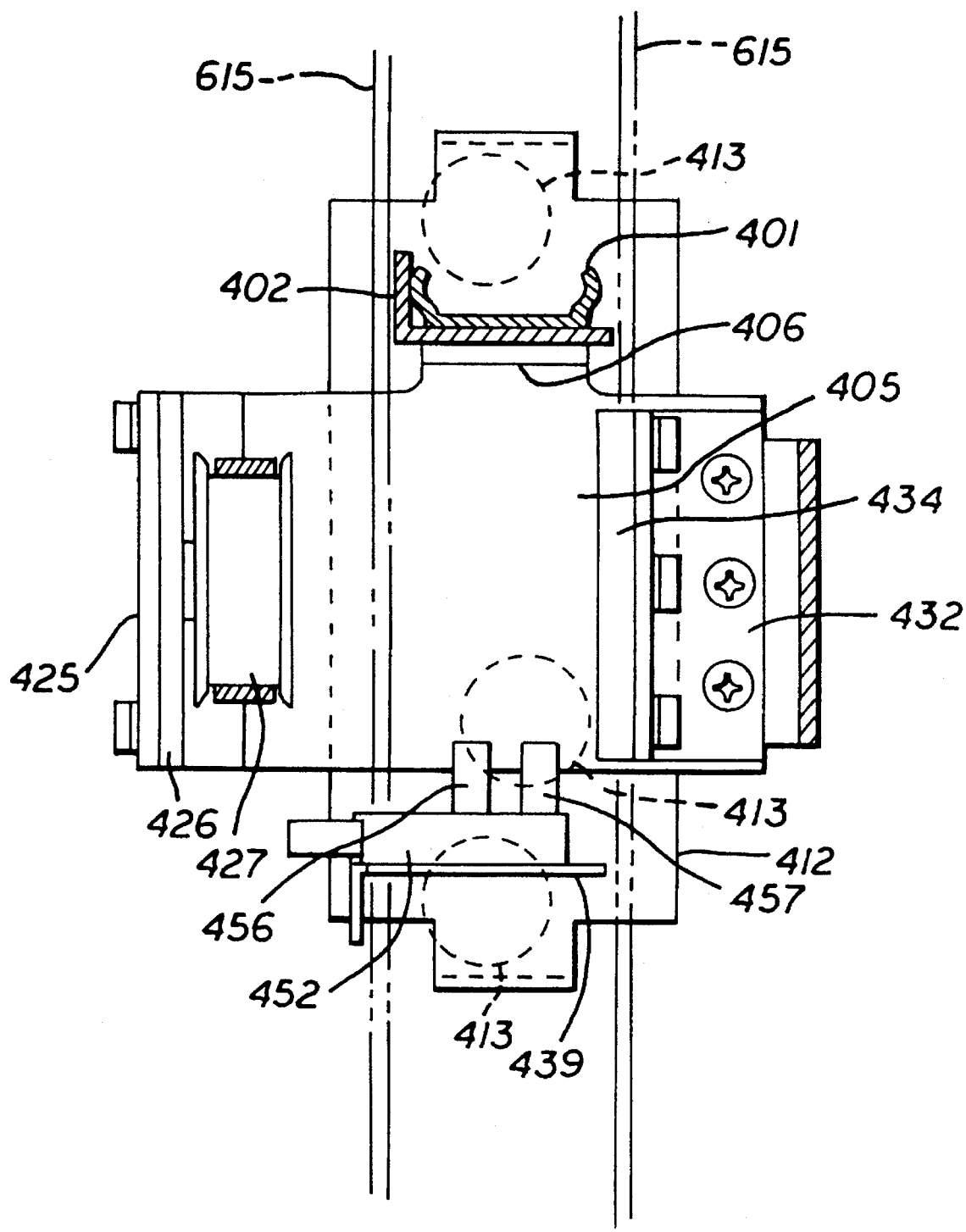
FIG. 14 is a section taken along line X—X of FIG. 13.
Figure 15:
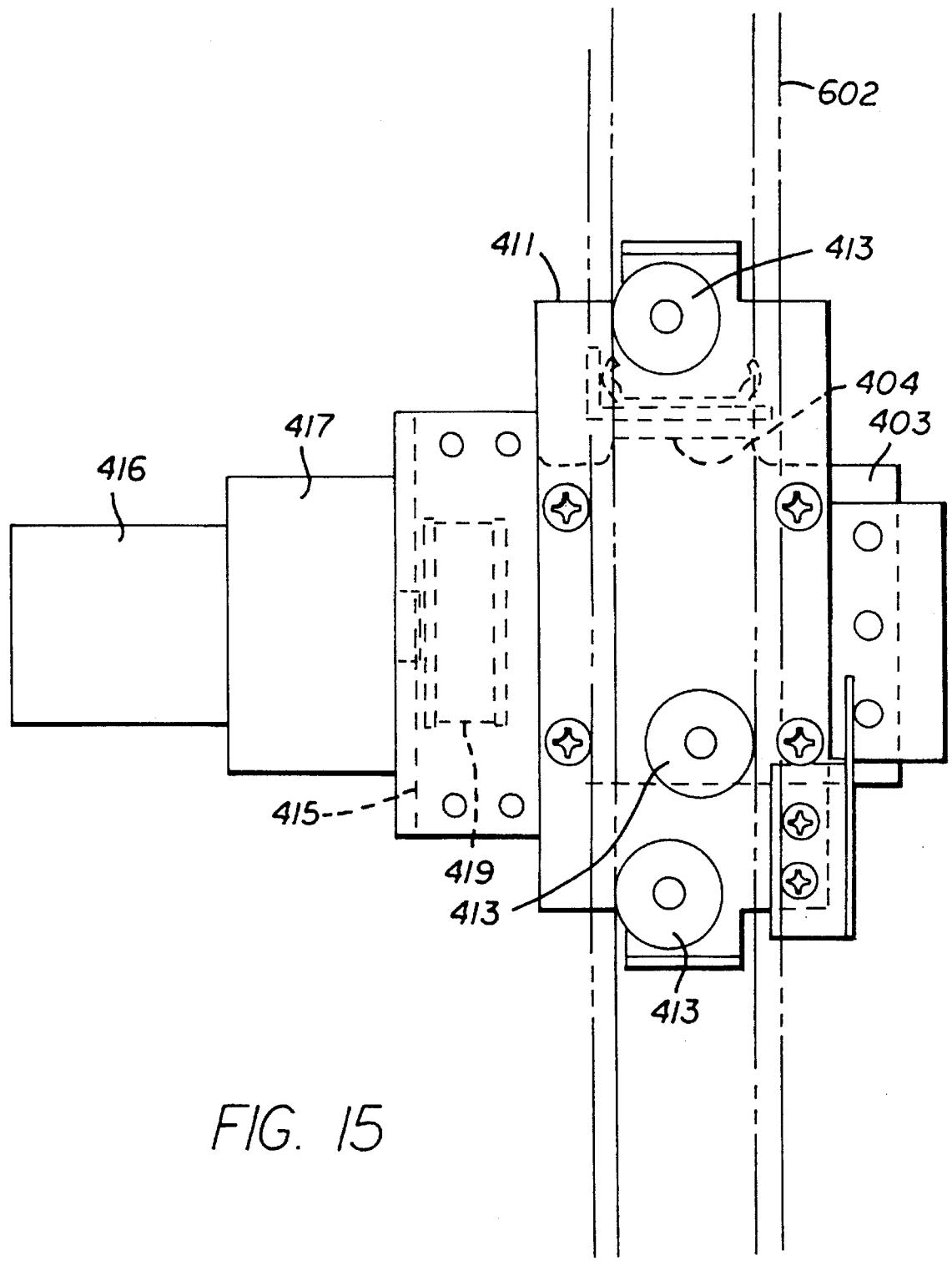
FIG. 15 is a side elevation of the horizontal drive means.
Figure 16:
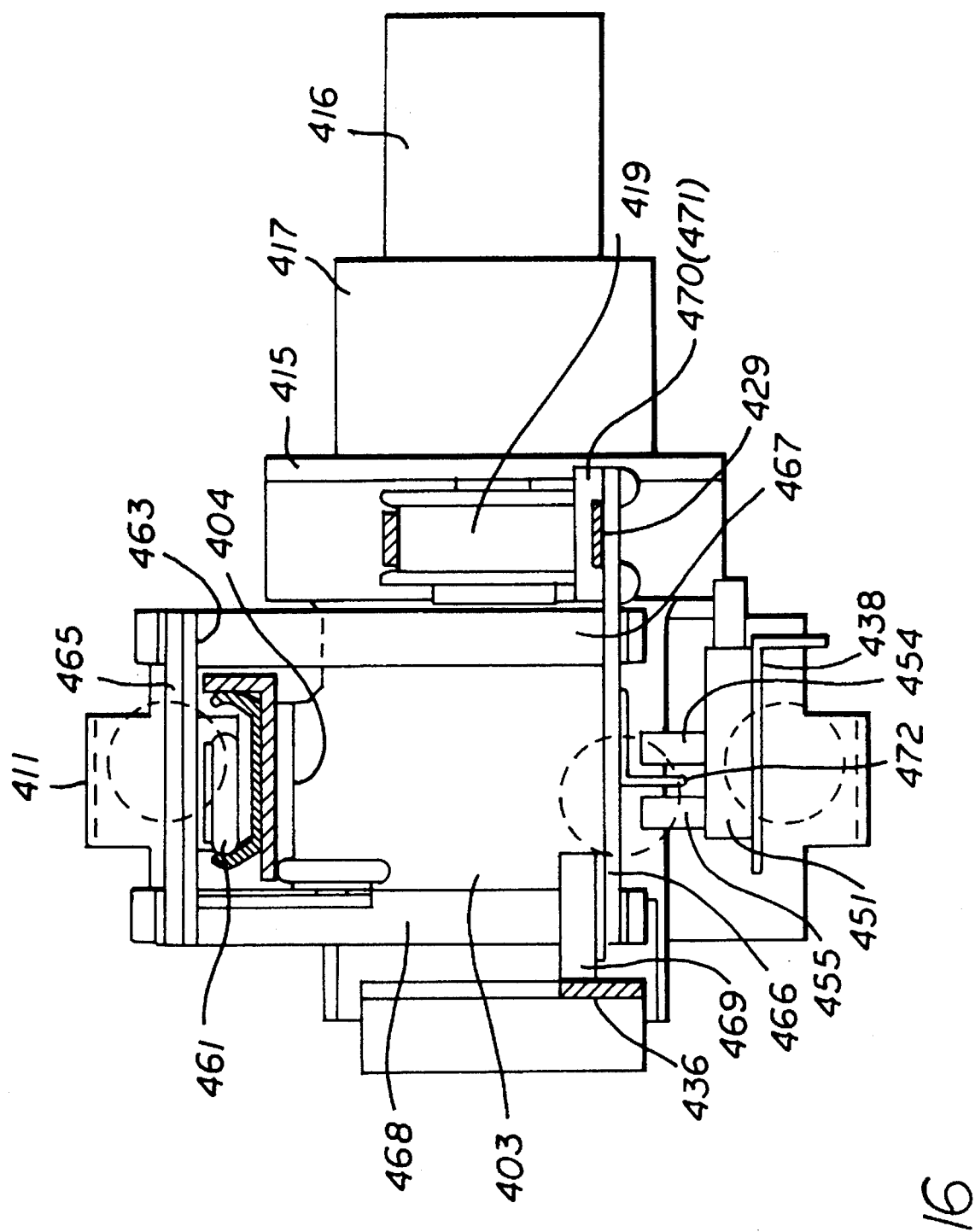
FIG. 16 is a section taken along line Y—Y of FIG. 13.

The horizontal drive means 400 will be described with reference to FIGS. 11 to 16. FIG. 12 is a top plan view of the horizontal drive means 400. FIG. 13 is a front elevation of the horizontal drive means 400. FIG. 14 is a section taken along line X—X of FIG. 13. FIG. 15 is a side elevation of the horizontal drive means 400. FIG. 16 is a section taken along line Y—Y of FIG. 13.

The horizontal drive means 400 is equipped with a horizontal rail 401. This horizontal rail 401 is mounted by fixing it on a reinforcing member 402 having a generally L-shaped section. This reinforcing member 402 has its lefthand side portion fixed at its lower face on a folded upper end portion 404 of a lefthand fixing plate 403 and its righthand portion fixed at its lower face on a folded upper end portion 406 of a righthand fixing plate 405.

On the sides of the lefthand and righthand fixing plates 403 and 405, there are fixed by means of bolts lefthand and righthand guide plates 411 and 412. These lefthand and righthand guide plates 411 and 412 are equipped on their side faces with a plurality of guide wheels 413 which can roll along the vertical rails 602 and 603 of the aforementioned vertical drive means 600.

On one side of the inner face of the lefthand fixing plate 403, there is fixed by means of bolts a mounting member 415 having a generally L-shaped section, on which is fixed by means of bolts a reduction gear mechanism 417 having a motor 416. A drive belt pulley 419 is fixed on the output shaft of the reduction gear mechanism 417. The righthand fixing plate 405 has its one end edge 425 folded inward to fix a mounting member 426 having a generally L-shaped section by means of bolts. A play belt pulley 427 is rotatably mounted on the mounting member 426. A toothed belt (or timing belt) 429 is made to run on play belt pulley 427 and drive belt pulley 419.

On the other sides of the inner faces of the lefthand and righthand fixing plates 403 and 405, there are fixed by means of bolts mounting members 431 and 432, each having a generally L-shaped section. Clamping members 433 and 434 are fixed by means of bolts on those mounting members 431 and 432. The mounting member 431 is fixed on one side of the belt 615 by clamping the belt 615 between mounting member 431 and the clamping member 433. The mounting member 432 is fixed on one side of the belt 616 by clamping the belt 616 between mounting member 432 and the clamping member 434.

A guide member 436 for guiding the guide wheels 469 of a later-described carriage 460 is fixed by means of bolts between the sides of the lefthand fixing plate 403 and the righthand fixing plate 405. Below the other side faces of the lefthand and righthand guide plates 411 and 412, there are disposed mounting plates 438 and 439. A sensor member 451 having a light emitting element 454 and a light receiving element 455 is mounted on the mounting plate 438, and a sensor member 452 having a light emitting element 456 and a light receiving element 457 is mounted on the mounting plate 439.

Below the side face of the lefthand guide plate 411, moreover, there is fixed by means of bolts a shielding member 453 for shielding the light emitting element 531 and the light receiving element 632 of the sensor member 625 and the light emitting element 633 and the light receiving element 634 of the sensor member 626, as disposed above and below the aforementioned vertical rail 602.

On the horizontal rail 401, the carriage 460 is allowed to run horizontally. This carriage 460 has a guide plate 463 equipped with a plurality of guide wheels 461 which can roll along the horizontal rail 401. This guide plate 463 is equipped thereover with a mount 465 and therebelow with a lower plate 466 through a pair of front struts 467 and a pair of rear struts 468. These guide plate 463, mount 465, front struts 467, rear struts 468 and lower plate 466 are fixed altogether by means of bolts. The paired rear struts 468 are equipped at their lower portions with guide wheels 469 which can roll along the side face of the aforementioned guide member 436.

A pair of clamping members 470 and 471 are mounted by means of bolts on the front portion of the lower plate 466. This lower plate 466 is fixed at one side of the belt 429 by clamping the belt 429 between itself and the clamping members 470 and 471. On the lower face of the lower plate 466, on the other hand, there is fixed a shielding member 472 for shielding the light emitting element 454 and the light receiving element 455 of the sensor member 451, as disposed at the lefthand guide plate 411, and the light emitting element 456 and the light receiving element 457 of the sensor member 452, as disposed at the righthand guide plate 412.

Figure 17:
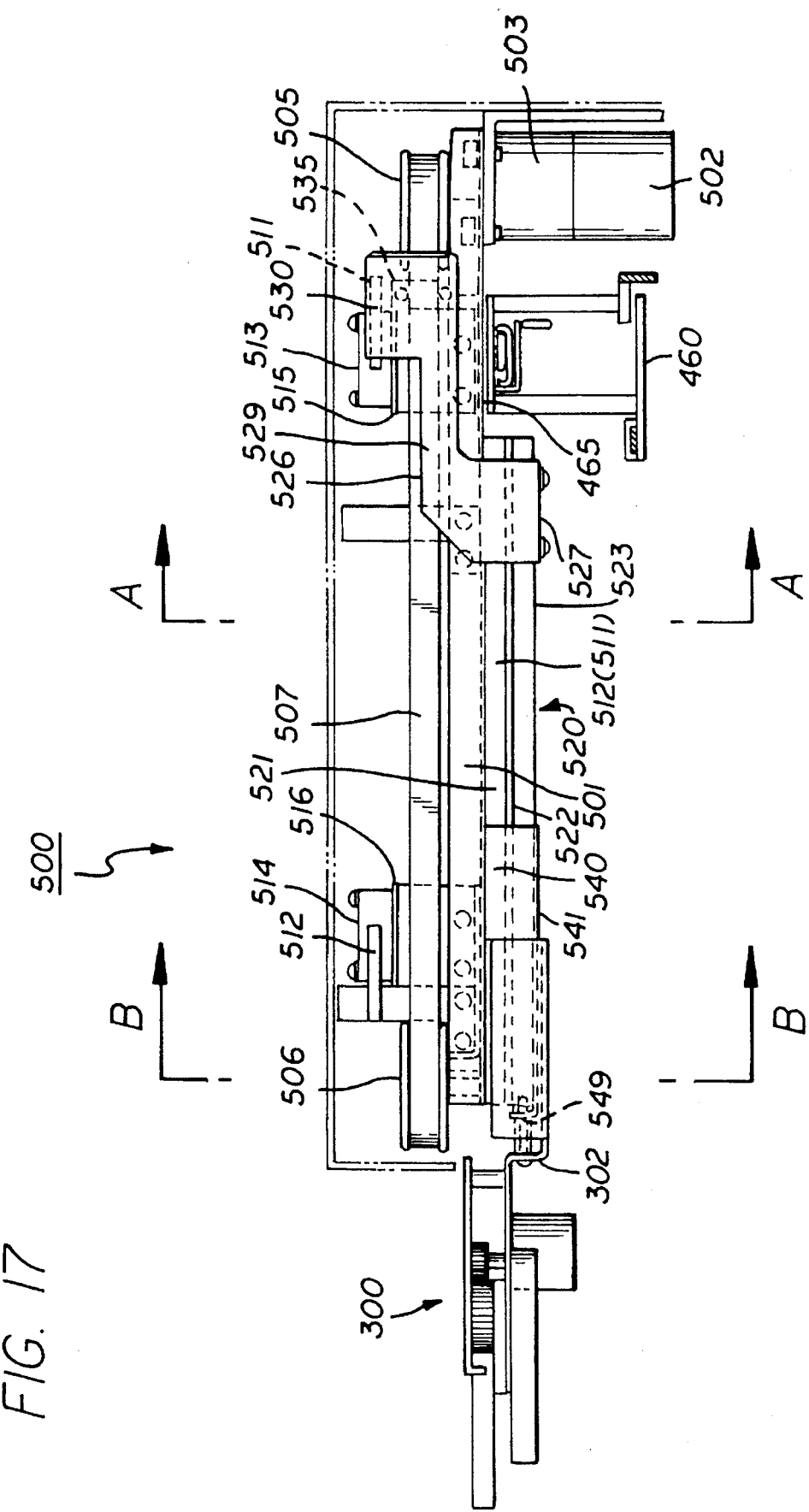
FIG. 17 is a side elevation of depthwise drive means according to an embodiment of the present invention.
Figure 18:
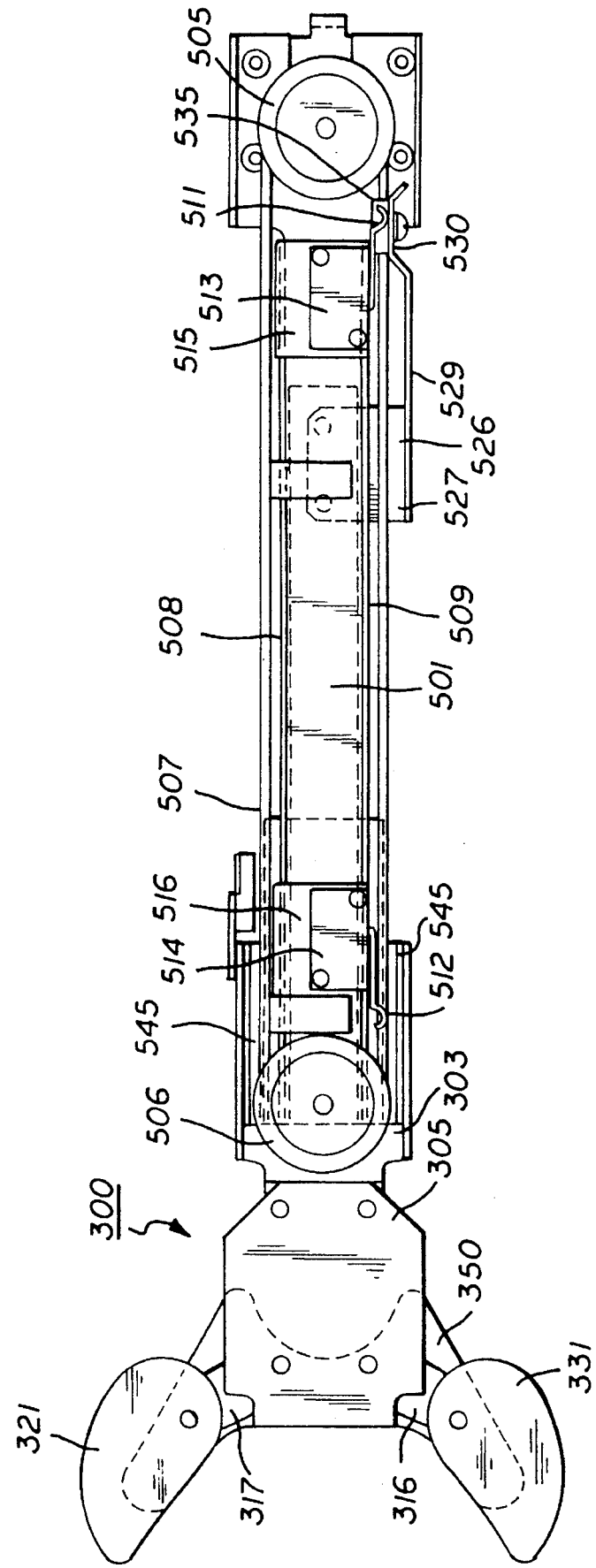
FIG. 18 is a top plan view of the depthwise drive means.
Figure 19:
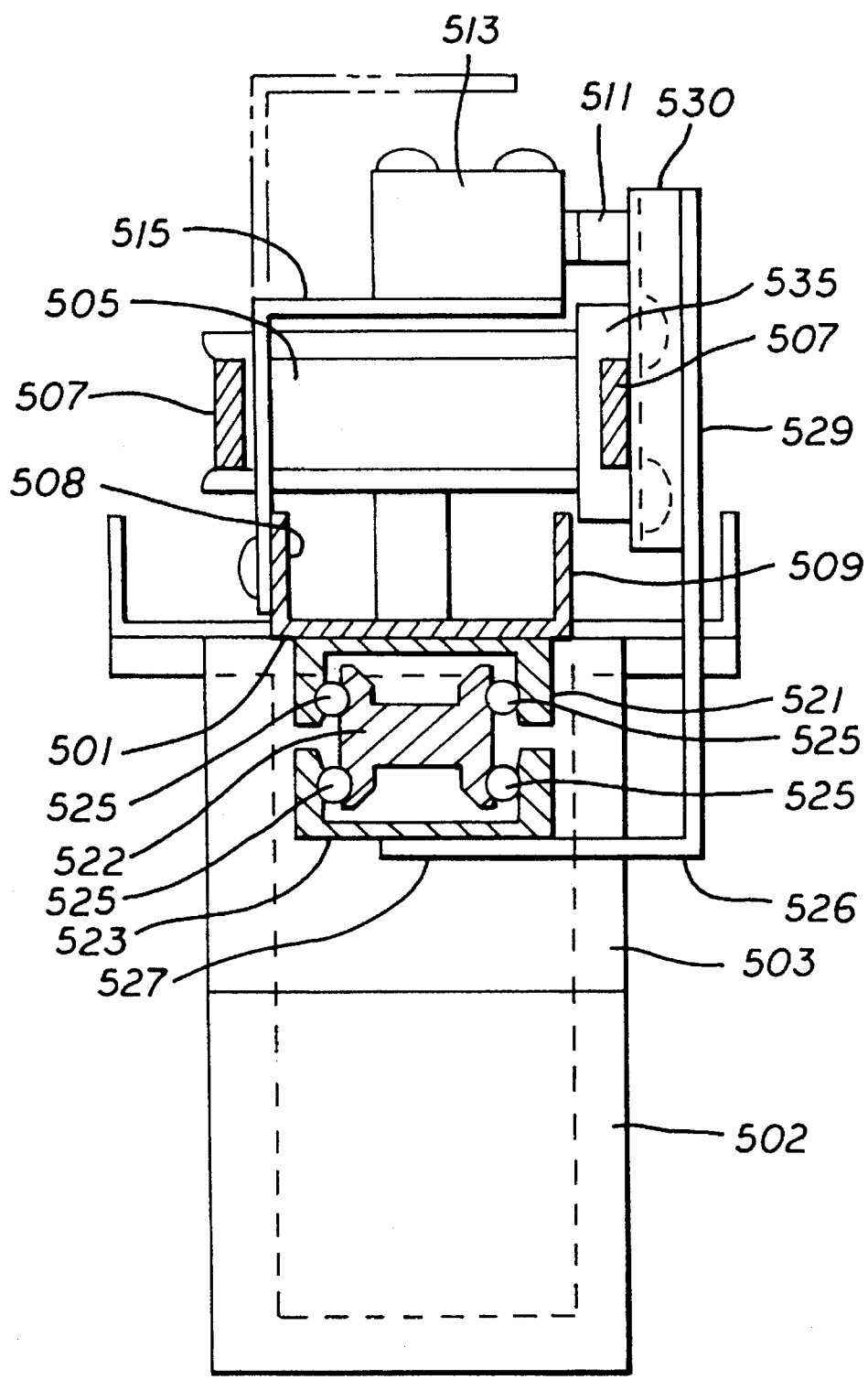
FIG. 19 is a section taken along line A—A of FIG. 17.
Figure 20:
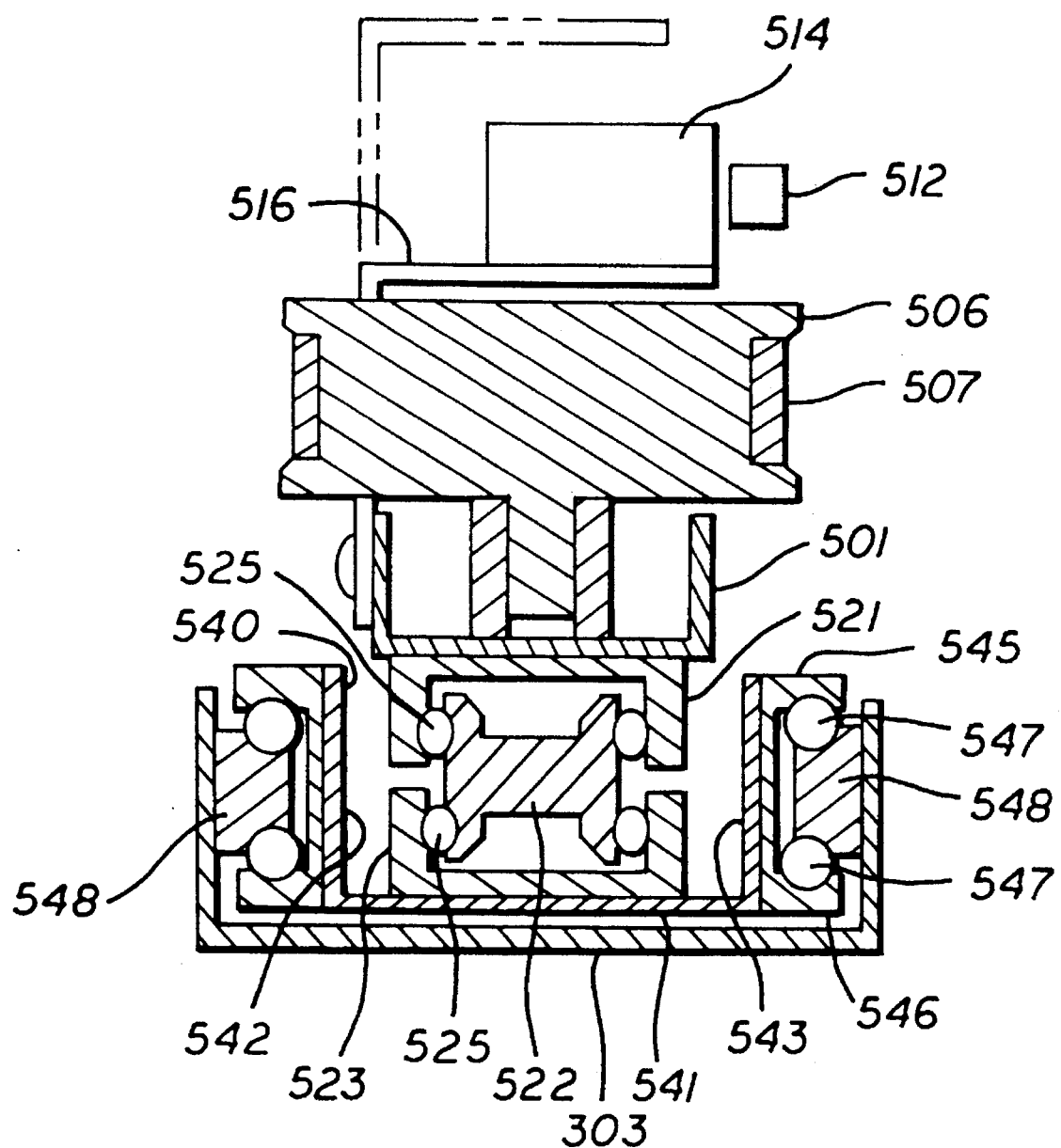
FIG. 20 is a section taken along line B—B of FIG. 17.

The depthwise drive means 500 will be described with reference to FIGS. 17 to 20. FIG. 17 is a side elevation of the depthwise drive means 500. FIG. 18 is a top plan view of the depthwise drive means 500. FIG. 19 is a section taken along line A—A of FIG. 17. FIG. 20 is a section taken along line B—B of FIG. 17.

The depthwise drive means 500 is equipped with an elongated mount 501. This mount 501 has its two sides folded to form side walls 508 and 509 which have their base end sides fixed at their lower faces to the mount 465 of the aforementioned carriage 460 by means of bolts.

On the lower faces of the base end portions of the mount 501, there is fixed by means of bolts a reduction gear mechanism 503 which is equipped with a drive motor 502. This reduction gear mechanism 503 has its output shaft protruded to above the mount 501 to mount a drive belt pulley 505 thereon. Above the leading end side of the mount 501, there is rotatably disposed a play belt pulley 506. A toothed belt (or timing belt) 507 is made to run on the play belt pulley 506 and the drive belt pulley 505.

Above the mount 501, as located in the vicinity of the drive belt pulley 505, there is disposed a sensor member 513 which is equipped with a push type switch 511. In the vicinity of the play belt pulley 506, there is disposed a sensor member 514 which is equipped with a push type switch 512. These sensor members 513 and 514 are fixed on generally L-shaped mounting plates 515 and 516 which are fixed on the side wall 508 of the mount 501 by means of bolts.

On the lower face of the mount 501, there is fixed an expansion mechanism 520. This expansion mechanism 520 is formed of an upper guide member 521 having a generally C-shaped section, a lower guide member 523 and a center member 522. The upper guide member 521 is fixed on the lower face of the mount 501 by means of bolts. The center member 522 is so mounted in the upper guide member 521 through ball bearings 525 as to move in the longitudinal direction. The lower guide member 523 is so mounted on the center member 522 through ball bearings 525 as to move in the longitudinal direction.

On the lower face of the base end portion of the lower guide member 523, there is mounted by means of bolts the bottom portion 527 of a mounting member 526 which has an inverted letter L, as viewed in a front elevation. A side wall portion 529, as folded generally at a right angle with respect to the bottom portion 527, has its rear portion folded inward to push the push type switches 511 and 512 of the aforementioned sensor members 513 and 514. On the rear portion 530, on the other hand, there is fixed a clamping member 535 by means of bolts. The mounting member 526 is fixed on one side of the toothed belt 507 clamping the toothed belt 507 between the rear portion 530 and the clamping member 535.

Figure 21:
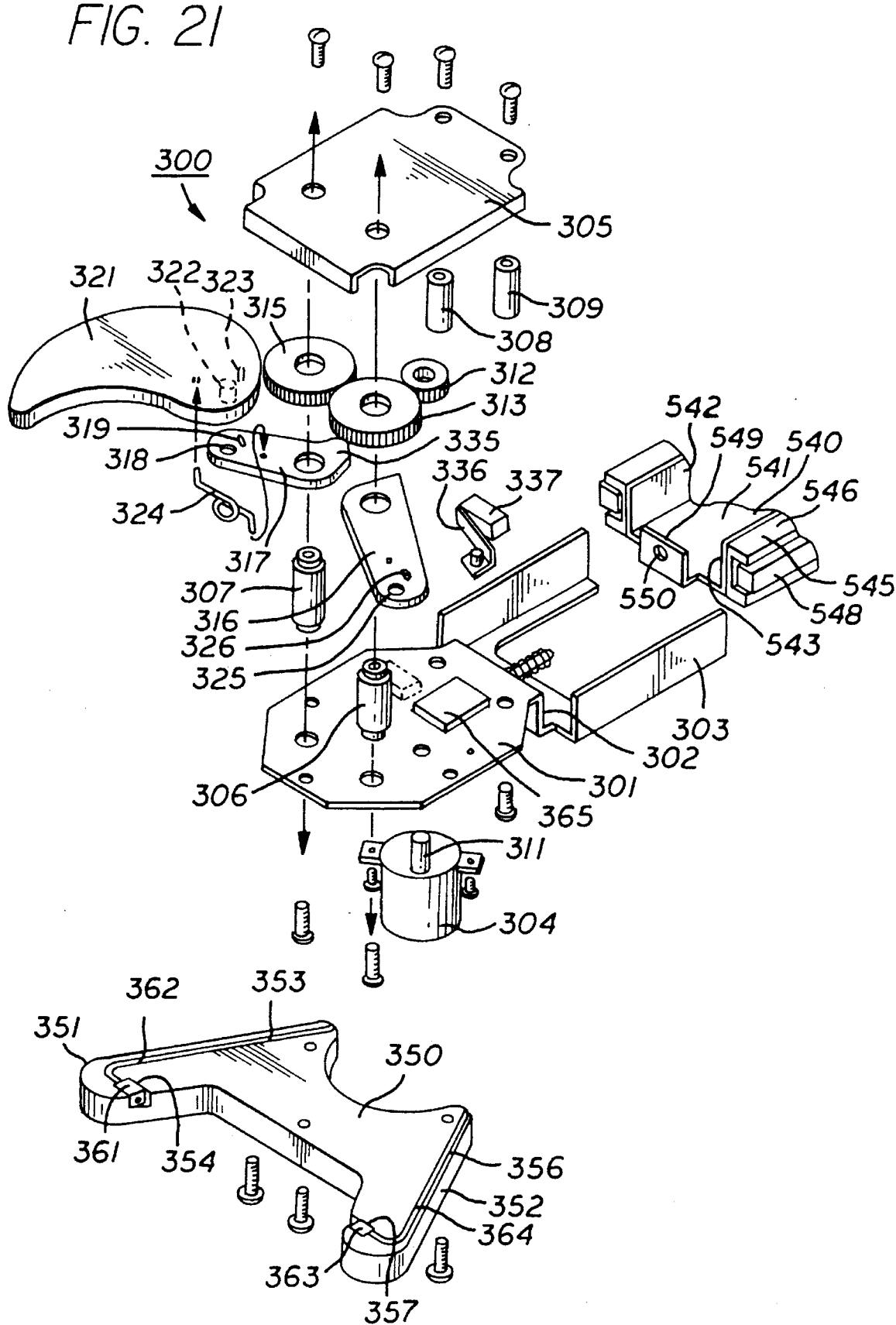
FIG. 21 is an exploded perspective of the grip means according to an embodiment of the present invention.

On the lower face of the leading end portion of the lower guide member 523, there is fixed by means of bolts the bottom portion 541 of a mounting member 540 generally having a shape of letter C, as viewed in a front elevation. This mounting member 540 is formed at its leading end portion with a folded plate 549 which is folded upward and formed at its center with a threaded hole 550 (as shown in FIG. 21).

On the two side faces of two side walls 542 and 543 of the mounting member 540, there is fixed an expansion mechanism 545. This expansion mechanism 545 is formed of guide members 546 having a generally C-shaped section and a slide member 548 which is mounted on the guide member 546 through ball bearings 547 so as to move in the longitudinal direction. The two guide members 546 are individually fixed on the two side walls 542 and 543 by means of bolts. A generally C-shaped fixing member 303 of the grip means 300 is sandwiched between the two side members 548 by means of bolts.

Figure 22:
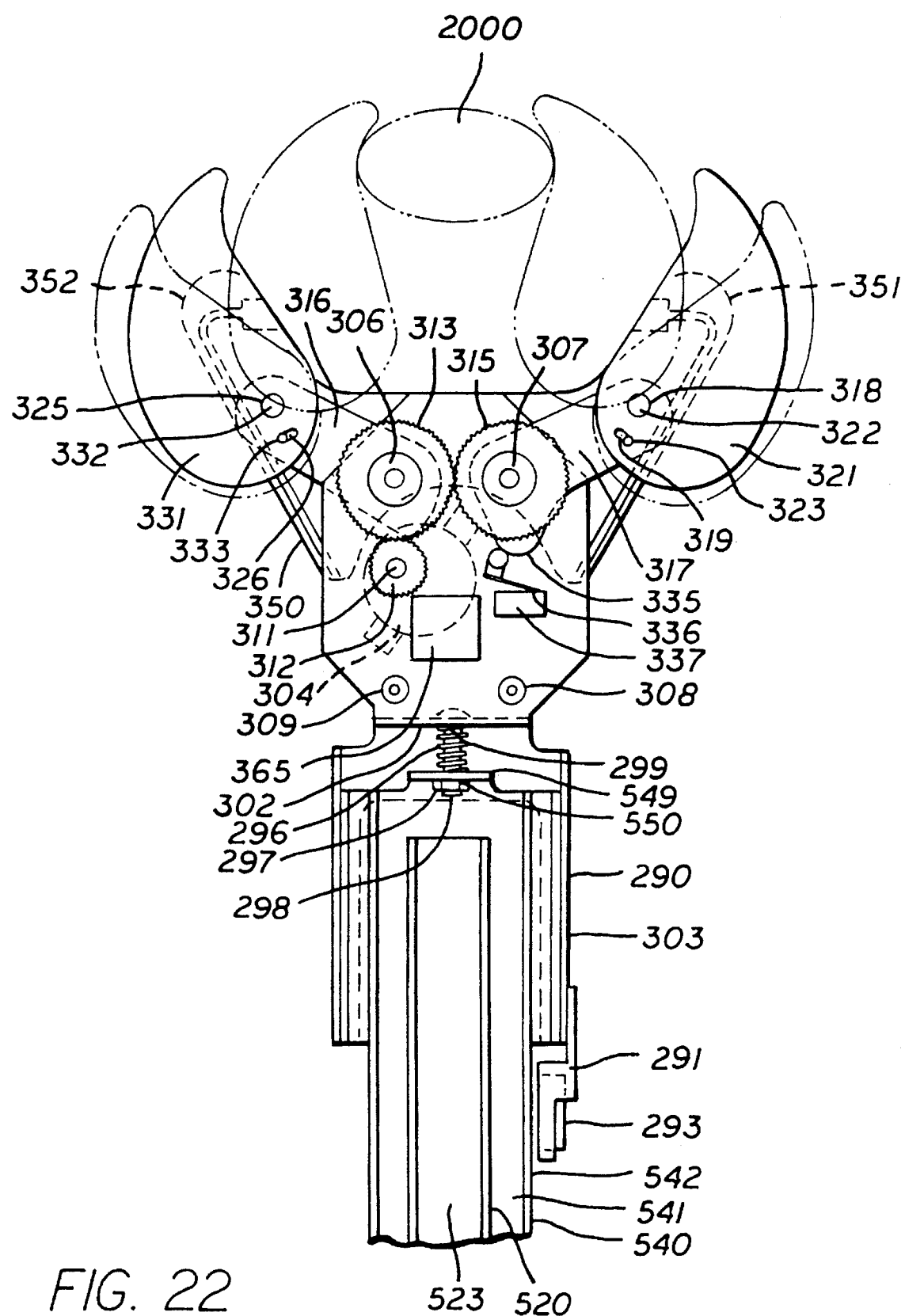
FIG. 22 is a partially omitted top plan view of the grip means of FIG. 21.
Figure 23:
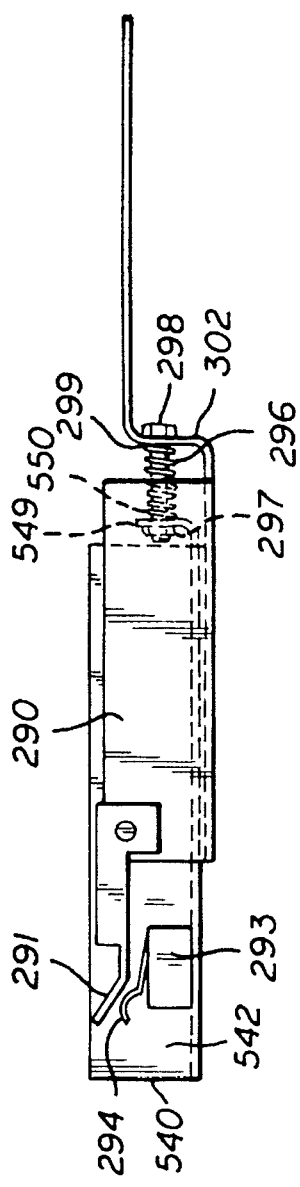
FIG. 23 is a side elevation of an essential portion of the game machine.

The grip means 300 will be described with reference to FIGS. 21 to 23. FIG. 21 is an exploded perspective view of the grip means 300. FIG. 22 is a partially omitted top plan view of the grip means 300. FIG. 23 is a side elevation of an essential portion of the grip means 300.

The grip means 300 includes a base 301. This base 301 has its rear end portion folded downward to form a folded member 302 which is integrally formed at its lower end with the generally C-shaped fixing member 303. This fixing member 303 is fixed on the two side members 548 by means of bolts.

On the upper face of the base 301, there are fixed by means of bolts a pair of center pins 306 and 307 and a pair of stationary pins 308 and 309. A cover plate 305 is fixed on those paired center pins 306 and 307 and paired stationary pins 308 and 309 by means of bolts.

On the lower face of the base 301, there is mounted by means of bolts a motor 304. This motor 304 has its output shaft 311 protruding to above the upper face of the base 301 to fit a drive gear 312 thereon. This drive gear 312 is in meshing engagement with a lefthand spur gear 313 which is rotatably fitted on the lefthand center pin 306. This lefthand spur gear 313 is in meshing engagement with a righthand spur gear 315 which is rotatably fitted on the righthand center pin 307.

To the lefthand spur gear 313, there is fixed a lefthand arm member 316 which has its base portion rotatably fitted on the center pin 306. Hence, the lefthand spur gear 313 and the lefthand arm member 316 need not be separated but may be united with each other. To the righthand spur gear 315, too, there is fixed a righthand arm member 317 which has its base portion rotatably fitted on the center pin 307. Hence, the righthand spur gear 315 and the righthand arm member 317 need not be separated but may be united with each other.

The righthand arm member 317 is formed at its leading end portion with a pin hole 318 and a slit 319. In the pin hole 318 of the righthand arm member 317, there is rotatably fitted a pivotal pin 322 which is anchored on the base portion of a righthand hand portion 321. In the slit 319, there is slidably fitted a pin 323 which is anchored in the vicinity of the pivotal pin 322 of the righthand hand portion 321. As a result, this righthand hand portion 321 is allowed to pivot on the pivotal pin 322 within the range for the pin 323 to slide in the slit 319, and is biased in the closing direction by a spring 324 which is mounted between the righthand hand portion 321 and the righthand arm member 317.

Likewise, the lefthand arm member 316 is formed at its leading end portion with a pin hole 325 and a slit 326. In the pin hole 325 of the lefthand arm member 316, there is rotatably fitted a pivotal pin 332 which is anchored at the base portion of a lefthand hand portion (although not shown in FIG. 21) which is symmetric to the righthand hand portion 321. In the slit 326, on the other hand, there is slidably fitted a pin 333 which is anchored in the vicinity of the pivotal pin 332 of the lefthand hand portion 331. As a result, the lefthand hand portion 331 is allowed to turn on the pivotal pin 332 within the range for the pin 333 to slide in the slit 326, and is biased in the closing direction by a spring (although not shown because it is identical to the spring 324) which is mounted between the lefthand hand portion 331 and the lefthand arm member 316.

On the base 301, there is mounted a sensor member 337 which is equipped with such a push switch 336 as is closed by the base end edge 335 of the righthand arm member 317 when the righthand arm member 317 is open. On the lower face of the base 301, there is mounted by means of bolts a sensor mounting plate 350. This sensor mounting plate 350 is formed with a righthand projection 351 extending so far as the intermediate portion of the righthand hand portion 321, and a lefthand projection 352 extending so far as the intermediate portion of the lefthand hand portion 331.

The sensor mounting plate 350 is formed with a long groove 353 along its righthand end edge. This long groove 353 has its leading end folded inward to communicate with a recess 354 which is formed in the inner portion of the righthand projection 351. In the recess 354, there is mounted a light emitting element 361, the electric wire 362 of which is arranged in the long groove 353.

The sensor mounting plate 350 is further formed with a long groove 356 along its lefthand end edge. This long groove 356 also has its leading end folded inward to communicate with a recess 357 which is formed in the inner portion of the lefthand projection 352. In the recess 357, there is mounted a light receiving element 363, the electric wire 364 of which is arranged in the long groove 356.

On the base 301, on the other hand, there is mounted a sensor member 365 (or sensor means) which is connected with the electric wire 362 of the light emitting element 361 and the electric wire 364 of the light receiving element 363 to detect that the key holder 2000 (or the article to be gripped) enters the gap between the hand portions 321 and 331 (or the light emitting element 361 and the light receiving element 363).

Generally at the center of the folded member 301, as opposed to the aforementioned threaded hole 550, there is formed a hole 299. A bolt 298 is inserted into the hole 299 and is fixed by means of a nut 297 which is fastened into the threaded hole 550. On this bolt 298, there is mounted a spring 296 for biasing the folded member 302 apart from the folded plate 549.

On the side wall 290 of the fixing member 303, as shown in FIG. 23, there is mounted a push member 291. This push member 291 is so disposed as to turn ON/OFF a push switch 294 of a sensor member 293 which is mounted on the side wall 542 of the mounting member 540.

The sensor members 293, 337, 451, 513, 514, 625, 626 and 365 and the motors 304, 416, 502 and 621 thus far described are electrically connected with the control means 700. This control means 700 is not especially shown in the drawings but is packaged in a predetermined space of the machine body 100.

The decorative cover member 102 is equipped on its front face with the input means 800 for inputting the instructions of the user. This input means 800 is constructed of the horizontal movement switch 810 and the vertical movement switch 820. The horizontal movement switch 810 is provided for actuating the horizontal drive means 400 and is continuously operative, while being depressed, to actuate the horizontal drive means 400 through the control means 700. The vertical movement switch 820 is provided for actuating the vertical drive means 600 and is continuously operative, while being depressed, to actuate the vertical drive means 600 through the control means 700.

The actions of another embodiment thus constructed will be described in the following. When the user inserts a coin through the coin slot into the machine body 100, the coin sensor means 900 detect the presence of the coin and sends a gate start signal to the control means 700, thereby to start the game. The user selects a desired one of the key holder 2000 suspended from the holder means 200 and depresses the vertical movement switch 820 so that the drive motor 621 is energized through the control means 700. The rotation of this drive motor 621 is transmitted through the output gear 623, the input gear 624 and the drive shaft 612 to the drive belt pulleys 613 and 614 to drive the toothed belts 615 and 616.

The horizontal drive means 400, as attached to the toothed belts 615 and 616, is moved upward as the toothed belts 615 and 616 are driven. When the grip means 300, as attached to the horizontal drive means 400, comes to the same level as that of the selected key holder 2000, the vertical movement switch 820 is released. Then, the drive motor 621 is deenergized to decide the level of the grip means 300.

Incidentally, if the vertical movement switch 820 is continuously depressed, the horizontal drive means 400 rises on and on. When, however, the shielding member 453 disposed at the side portion of the horizontal drive means 400 shields the optical transmission between the light emitting element 631 and the light receiving element 632 of the sensor member 625, as disposed in the upper portion of the vertical rail 602, the sensor member 625 detects the shielding member 453 and sends a detection signal to the control means 700 to stop the energization of the drive motor 621.

When the horizontal movement switch 810 is depressed, the motor 416 is energized through the control means 700. Then, the rotation of the motor 416 is transmitted through the reduction gear mechanism 417 to the drive belt pulley 419 to actuate the toothed belt 429. The carriage 460, as attached to the toothed belt 429, is moved rightward in accordance with the actuation of the toothed belt 429. When the grip means 300 carried by the carriage 460 comes to the front position of the selected key holder 2000, the horizontal movement switch 810 is released. Then, the energization of the motor 416 is stopped to decide the horizontal position of the grip means 300.

Incidentally, if the horizontal movement switch 81 is continuously depressed, the carriage 460 is moved on and on. When, however, the shielding member 472 disposed in the lower portion of the carriage 460 shields the optical transmission between the light emitting element 456 and the light receiving element 457 of the sensor member 452 at the side of the righthand guide plate 412, the sensor member 452 detects the shielding member 472 to send a detection signal to the control means 700 thereby to stop the energization of the motor 416.

Figure 24:
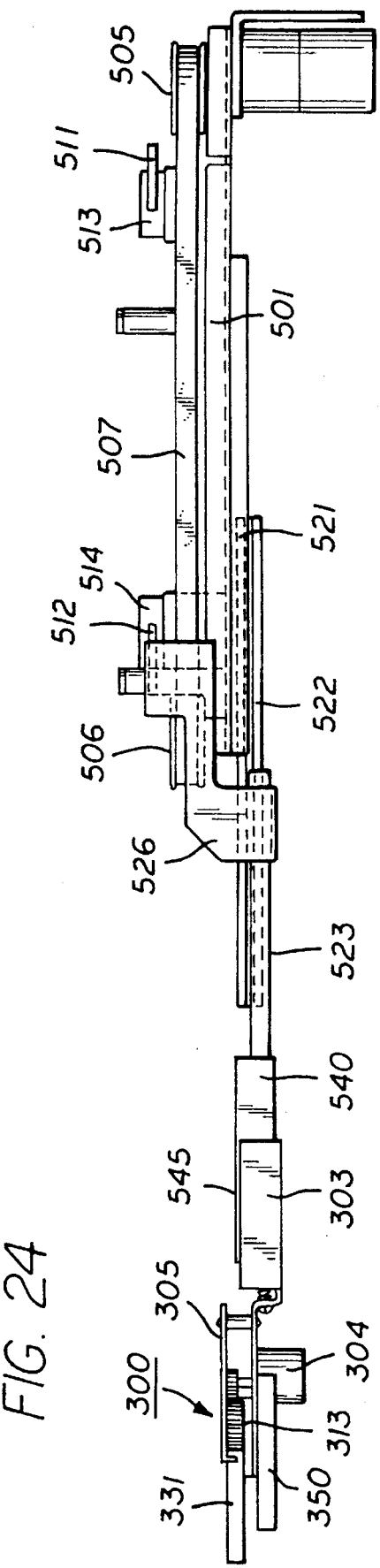
FIG. 24 is a side elevation showing the acting state of the depthwise drive means.
Figure 25:
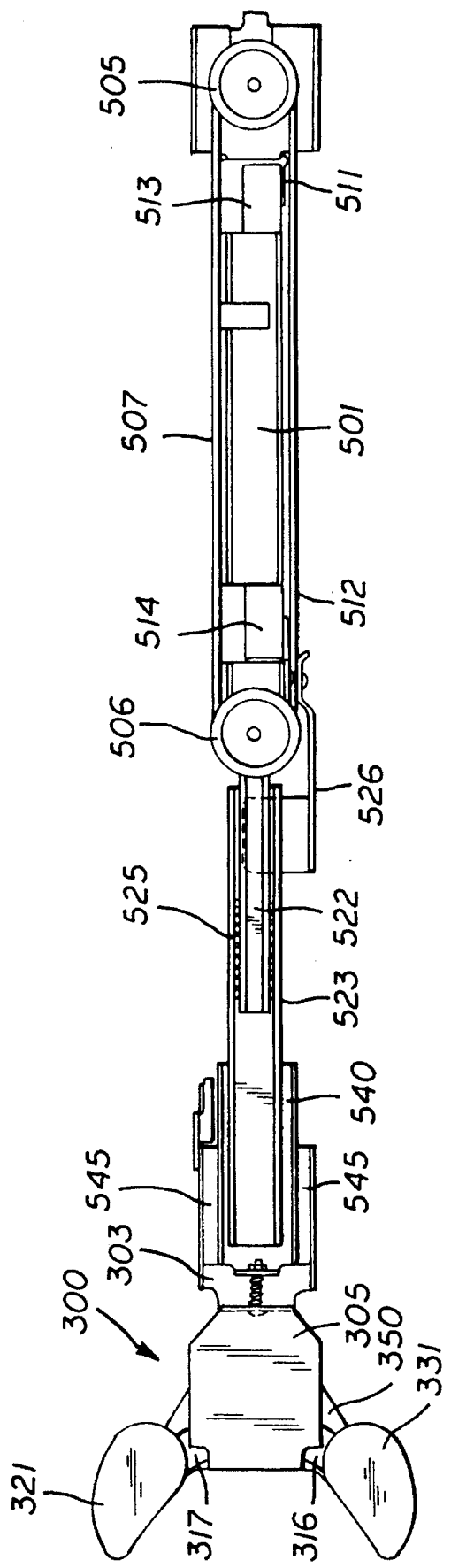
FIG. 25 is a front elevation showing the acting state of the depthwise drive means.

When the motor 416 is thus deenergized, the control means 700 quickly energizes the drive motor 502 so that the rotation of the drive motor 502 is transmitted through the reduction gear mechanism 503 to the drive belt pulley 505 thereby to actuate the toothed belt 507. The lower guide member 523, as attached to the toothed belt 507 through the mounting member 526, is extended forward (as shown in FIGS. 24 and 25) in accordance with the actuation of the toothed belt 507.

When the grip means 300 attached to the lower guide member 523 is extended to the position of the selected key holder 2000, this key holder 2000 enters the gap between the light emitting element 361 and the light receiving element 363 of the sensor mounting plate 350 so that the sensor member 365 (or sensor means) disposed on the base 301 detects the presence of the key holder 2000 to send a detection signal to the control means 700. Then, this control means 700 quickly stops the energization of the drive motor 502 to decide the depthwise position of the grip means 300.

On the other hand, the control means 700 energizes the motor 304 of the grip means 300 for a predetermined time period to rotate the drive gear 312, the lefthand spur gear 313 and the righthand spur gear 315 thereby to turn the lefthand arm member 316 and the righthand arm member 317 in the closing direction. Thus, the key holder 2000 is gripped (as shown in FIG. 22) by the lefthand hand portion 331 of the lefthand member 316 and the righthand portion 321 of the righthand arm member 317. Incidentally, these lefthand and righthand hand portions 331 and 321 may fall to grip and may be just closed.

On the other hand, the lefthand hand portion 331 and the righthand hand portion 321 are biased in the closing direction by the spring 324. As a result, these lefthand and righthand portions 331 and 321 are turned in the opening direction, when they grip the key holder 2000, against the elasticity of the spring 324 within the range for the aforementioned pins 323 and 333 to move. When the control means 700 energizes the motor 304 for a predetermined time period, the motor 304 is deenergized after lapse of the predetermined time period so that the lefthand and righthand hand portions 331 and 321 are kept in the state (or their closed state) to grip the key holder 2000.

The gap between the lefthand hand portion 331 and the righthand hand portion 321 when closed can be freely decided by the time period for the control means 700 to run (or energize) the motor 304 and adjusted to the size of the article to be gripped. When the righthand hand portion 321, i.e., the righthand arm member 317 is closed, its pressure is released to open the push switch 336 of its base end edge 335.

If the sensor member 365 (or sensor means) fails to detect the key holder 2000, the grip means 300 moves on and on forward. After this movement proceeds to some extent, the rear portion 530 of the mounting member 526 pushes the push type switch 512 of the sensor member 514 disposed at the leading end side of the base 501, thereby to stop the energization of the drive motor 502 through the control means 700.

If the grip means 300 is incorrectly moved forward to come into abutment against the leading end of the holder means 200, it is pushed by the holder means 200. However, the grip means 300 is pushed against the elasticity of the spring 296 so that the push member 291 pushes the push switch 294 of the sensor member 293 thereby to stop the energization of the drive motor 502 through the control means 700. As a result, the grip means 300 is not moved forward any farther so that it is prevented from any damage.

When the grip means 300 grips the key holder 2000 or when the energization of the drive motor 502 is once stopped, as described above, the control means 700 reverses the rotation of the drive means 502 to return the lower guide member 523 to the initial position. When this lower guide member 523 restores the original position, the rear portion 530 of the mounting member 526 pushes the push type switch 511 of the sensor member 513 disposed at the base end side of the base 501, to deenergize the drive motor 502 through the control means 700.

Next, the control means 700 reverses the rotation of the motor 416 thereby to return the carriage to the original position. When this carriage 460 restores the initial position, the shielding member 472 formed in the lower portion shields the optical transmission between the light emitting element 454 and the light receiving element 456 of the sensor member 451 at the side of the lefthand guide plate 411 so that the sensor member 451 sends the detection signal to the control means 700 to stop the energization of the motor 416.

Next, the control means 700 reverses the rotation of the drive motor 621 to return the horizontal drive means 400 to the initial position. When this horizontal drive means 400 restores the initial position, its shielding member 453 shields the optical transmission between the light emitting element 633 and the light receiving element 634 of the sensor member 626, as disposed in the lower portion of the vertical rain 602, so that the sensor member 626 sends the detection signal to the control means 700 to stop the energization of the drive motor 621.

When the grip means 300 is thus returned to the initial position so that the grip means 300 grips the key holder 2000 (or the grip means 300 is just closed without gripping the key holder 2000), the control means 700 reverses the rotation of the motor 304 to open the hand portions 321 and 331 thereby to drop the key holder 2000 into the premium dropping opening 122. The key holder 2000 thus dropped into the premium dropping opening 122 can be taken out from the premium outlet 123.

When the righthand portion 321, i.e., the righthand arm member 317 opens, its base end edge 335 pushes to turn ON the push switch 336. When the sensor member 337 detects the ON state of the push switch 336, it sends the detection signal to the control means 700. This control means 700 then stops the energization of the motor 304 to return the lefthand hand portion 331 and the righthand hand portion 321 to their initial open states. The gap between these lefthand and righthand hand portions 331 and 321 when they are open is always constant unlike that at the closed time, because it is decided by the ON/OFF of the push switch 336.

Figure 26:
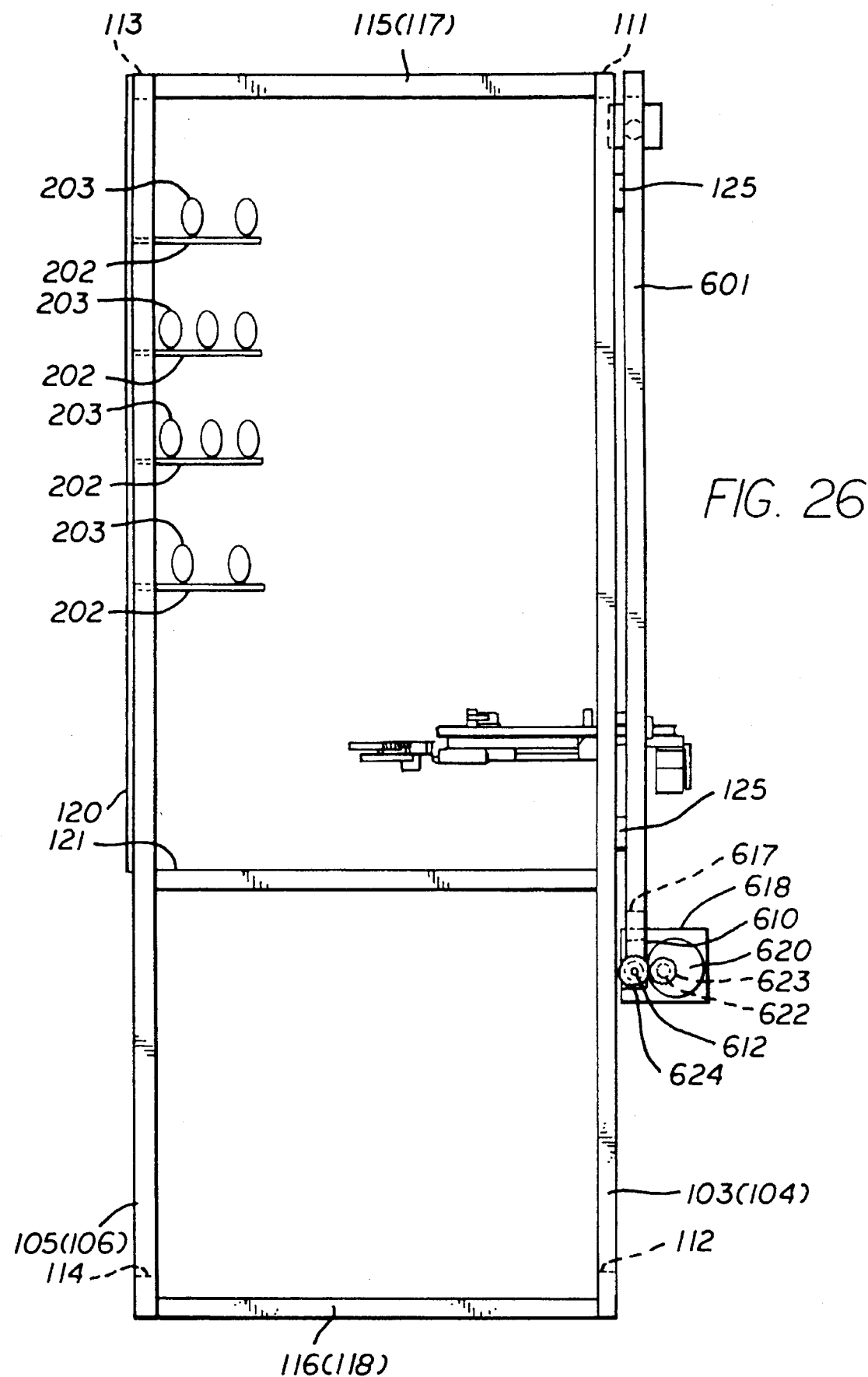
FIG. 26 is a side elevation showing still another embodiment.

In the embodiments thus far described, the article to be gripped is exemplified by the key holder 2000. To the rear wall 12, however, as shown in FIG. 26, there may be attached a shelf 202 for placing a premium or doll 203 thereon. In this modification, the premium or doll is the article to be gripped.

In the foregoing embodiments, moreover, the belts are used for actuating the individual drive means. However, these actuators should not be limited to the belts but can naturally be exemplified by the known parts including chains or feed screws.

According to the invention, as defined in claim 1, there can be achieved an effect to provide a novel game machine which is enabled to move the grip means at this side in a two-dimensional plane in a vertical direction or in a horizontal direction by the drive means thereby to grip an article or premium disposed at the deep side. Moreover, the articles can be vertically or horizontally arranged at the deep side so that they can be easily observed in the front view unlike that the catcher gate machine of the prior art, in which the articles have to be observed downward. As a result, the game machine of the invention provides not only a visual uniqueness but also a decorative display.

In brief summary, according to the first embodiment, a novel game machine is provided in which the grip means is moved in a vertical direction or in a horizontal direction by the drive means and can grip an article and premium disposed at the deep side. According to the second embodiment, a novel game machine requiring skill to move the grip means three dimensionally, in a vertical direction, in a horizontal direction and in a depth wise direction thereby to attempt to grip an article or premium disposed at the deep side, is provide. According to the third embodiment, the grip means is equipped with a sensor means for detecting an article to be gripped, so that paired hands on the gripper are closed so as to grip an article detected by the sensor means. According to the fourth embodiment, the grip means is equipped with a sensor means for detecting an article to be gripped. The depthwise drive means is stopped and paired hands on the gripper are closed so as to grip the article when it is detected by the sensor means. Thus, the grip means avoids pushing the articles when it acts to grip them. In addition, the grip means preferably takes out the article that is closest to the grip means. As a result, damage to the article is minimized. According to the fifth and sixth embodiment of the invention, after the input means is operated to move the grip means and to thereby grip an article, the control means automatically returns the grip means to its initial position and causes the grip means to release the article, at the initial position. According to the seventh embodiment, when the grip means impinges upon an obstacle, such as the deep wall, the drive of the horizontal drive means is stopped, thereby stopping the motion of the gripper. As a result, damage to the grip means is avoided because the grip means will not move any further after contact is made.

What is claimed is:

1. A game machine containing a plurality of articles disposed therein, comprising:
   (a) a machine body having a vertical first side and a vertical deep side opposite the first side, the plurality of articles being disposed between the first side and the deep side;
   (b) grip means disposed within said machine body for gripping at least one of said a plurality of articles;
   (c) drive means for moving said grip means, said drive means including:
      vertical drive means for moving said grip means in a vertical direction; and depthwise drive means for moving said grip means in a depthwise direction from a position adjacent said first side towards said deep side;
   (d) control means disposed in said machine body for controlling the starting and stopping of said drive means; and
   (e) input means actuatable by a game player for sending start and stop signals, as indicated by the actuation of said input means by said game player, to said control means to respectively start and stop said vertical drive means,
   (f) wherein said control means actuates said depthwise drive means, after said vertical drive means is stopped, to move said grip means toward said article.

2. A game machine according to claim 1, wherein said grip means includes: a pair of hands;
   hand drive means for opening/closing said paired hands; and
   sensor means for detecting the entrance of said article into between said paired hands, whereby when said sensor means detects the entrance of said article into between said paired hand, it sends its detection signal to said control means so that said control means actuates said hand drive means to close said paired hands.

3. A game machine according to claim 1, wherein said grip means includes:
   a pair of hands;
   hand drive means for opening/closing said paired hands; and
   sensor means for detecting the entrance one of said articles into between said paired hands, whereby when said sensor means detects the entrance of said one of said articles into between said paired hand, it sends its detection signal to said control means so that said control means stops the depthwise drive means and actuates said hand drive means to close said paired hands.

4. A game machine containing a plurality of articles disposed therein, comprising:
   (a) a machine body having a vertical first side and vertical deep side opposite the first side, the plurality of articles being disposed between the first side and the deep side;
   (b) grip means disposed within said machine body for gripping at least one of said a plurality of articles;
   (c) drive means for moving said grip means, said drive means including:
      horizontal drive means for moving said grip means in a horizontal direction; and depthwise drive means for moving said grip means in a depthwise direction from a position adjacent said first side towards said deep side;
   (d) control means disposed in said machine body for controlling the starting and stopping of said drive means; and
   (e) input means actuatable by a game player for sending start and stop signals, as indicated by the actuation of said input means by said game player, to said control means to respectively start and stop said horizontal drive means,
   (f) wherein said control means actuates said depthwise drive means, after said horizontal drive means, to move said grip means toward said article.

5. A game machine according to claim 4, wherein said grip means includes:
   a pair of hands;
   hand drive means for opening/closing said paired hands; and
   sensor means for detecting the entrance of said article into between said paired hands, whereby when said sensor means detects the entrance of said article into between said paired hand, it sends its detection signal to said control means so that said control means actuates said hand drive means to close said paired hands.

6. A game machine according to claim 5, wherein the grip means is attached to said horizontal drive means, further comprising:
   bias means for biasing said grip means forward while it is attached to the front position of said horizontal drive means such that said grip means can freely move in the horizontal direction; and
   sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

7. A game machine according to claim 4, wherein said grip means includes:

a pair of hands;

hand drive means for opening/closing said paired hands; and sensor means for detecting the entrance one of said articles into between said paired hands, whereby when said sensor means detects the entrance of said one of said articles into between said paired hands, it sends its detection signal to said control means so that said control means stops the depthwise drive means and actuates said hand drive means to close said paired hands.

8. A game machine according to claim 7, wherein the grip means is attached to said horizontal drive means, further comprising:

bias means for biasing said grip means forward while it is attached to the front portion of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

9. A game machine according to claim 4, wherein the grip means is attached to said horizontal drive means, further comprising:

bias means for biasing said grip means forward while it is attached to the front position of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

10. A game machine containing a plurality of articles disposed therein, comprising:

(a) a machine body having a vertical first side and a vertical deep side opposite the first side, the plurality of articles being disposed between the first side and the deep side;

(b) grip means disposed within said machine body for gripping at least one of said a plurality of articles;

(c) drive means for moving said grip means, said drive means including:
vertical drive means for moving said grip means in a vertical direction; horizontal drive means for moving said grip means in a horizontal direction; and depthwise drive means for moving said grip means in a depthwise direction from a position adjacent said first side towards said deep side;

(d) control means disposed in said machine body for controlling the starting and stopping of said drive means; and (e) input means actuatable by a game player for sending start and stop signals, as indicated by the actuation of said input means by said game player, to said control means to respectively start and stop said vertical drive means and said horizontal drive means, (f) wherein said control means actuates said depthwise drive means, after said horizontal drive means and said vertical drive means are stopped, to move said grip means toward said article.

11. A game machine according to claim 10, wherein said grip means includes:

a pair of hands;

hand drive means for opening/closing said paired hands; and sensor means for detecting the entrance of said article into between said paired hands, whereby when said sensor means detects the entrance of said article into between said paired hands, it sends its detection signal to said control means so that said control means actuates said hand drive means to close said paired hands.

12. A game machine according to claim 11, wherein the grip means is attached to said horizontal drive means, further comprising:

bias means for biasing said grip means forward while it is attached to the front position of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

13. A game machine according to claim 10, wherein said grip means includes:

a pair of hands;

hand drive means for opening/closing said paired hands; and sensor means for detecting the entrance of one of said articles into between said paired hands, whereby when said sensor means detects the entrance of said one of said articles into between said paired hands, it sends its detection signal to said control means so that said control means stops the depthwise drive means and actuates said hand drive means to close said paired hands.

14. A game machine according to claim 13, wherein the grip means is attached to said horizontal drive means, further comprising:

bias means for biasing said grip means forward while it is attached to the front portion of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

15. A game machine according to claim 10, wherein the grip means is attached to said horizontal drive means, further comprising:

bias means for biasing said grip means forward while it is attached to the front position of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

16. A game machine containing a plurality of articles disposed therein, comprising:

(a) a machine body having a vertical first side and a vertical deep side opposite the first side, the plurality of articles being disposed between the first side and the deep side;

(b) grip means disposed within said machine body for gripping at least one of said a plurality of articles, the grip means having home position within said machine body;

(c) drive means for moving said grip means, said drive means including:

vertical drive means for moving said grip means in a vertical direction; and depthwise drive means for moving said grip means in a depthwise direction from a position adjacent said first side towards said deep side;

(d) control means disposed in said machine body for controlling the starting and stopping of said drive means; and (e) input means for sending start and stop signals to said control means to respectively start and stop said vertical drive means, (f) wherein said control means actuates said depthwise drive means, after said vertical drive means is stopped, to move said grip means toward said article, (g) wherein said grip means includes: a pair of hands; hand drive means for opening/closing said paired hands; and sensor means for detecting the entrance of said article into between said paired hands, whereby when said sensor means detects the entrance of said article into between said paired hands, it sends its detection signal to said control means so that said control means stops the actuation of said depthwise drive means and actuates said hand drive means to close said paired hands, and (h) wherein said control means actuates, with said paired hands being closed, said drive means to return said grip means to said home position and actuates said hand drive means to open said paired hands.

17. A game machine containing a plurality of articles disposed therein, comprising:

(a) a machine body having a vertical first side and a vertical deep side opposite the first side, the plurality of articles being disposed between the first side and the deep side;

(b) grip means disposed within said machine body for gripping at least one of said a plurality of articles, the grip means having a home position within said machine body;

(c) drive means for moving said grip means, said drive means including:

horizontal drive means for moving said grip means in a horizontal direction; and depthwise drive means for moving said grip means in an depthwise direction from a position adjacent said first side toward said deep side;

(d) control means disposed in said machine body for controlling the starting and stopping of said drive means; and (e) input means for sending start and stop signals to said control means to respectively start and stop said horizontal drive means, (f) wherein said control means actuates said depthwise drive means, after said horizontal drive means and said vertical drive means are stopped, to move said grip means toward said article, (g) wherein said grip means includes: a pair of hands; hand drive means for opening/closing said paired hands; and sensor means for detecting the entrance of said article into between said paired hands, whereby when said sensor means detects the entrance of said article into between said paired hands, it sends its detection signal to said control means so that said control means stops the actuation of said depthwise drive means and actuates said hand drive means to close said paired hands, and (h) wherein said control means actuates, with said paired hands being closed, said drive means to return said grip means to said home position and actuates said hand drive means to open said paired hands.

18. A game machine according to claim 17, wherein the grip means is attached to said horizontal drive means, further comprising:

bias means for biasing said grip means forward while it is attached to the front portion of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

19. A game machine containing a plurality of articles disposed therein, comprising:

(a) a machine body having a vertical first side and a vertical deep side opposite the first side, the plurality of articles being disposed between the first side and the deep side;

(b) grip means disposed within said machine body for gripping at least one of said a plurality of articles, the grip means having a home position within said machine body;

(c) drive means for moving said grip means, said drive means including:

vertical drive means for moving said grip means in a vertical direction; horizontal drive means for moving said grip means in a horizontal direction; and depthwise drive means for moving said grip means in an depthwise direction from a position adjacent said first side toward said deep side;

(d) control means disposed in said machine body for controlling the starting and stopping of said drive means; and (e) input means for sending start and stop signals to said control means to respectively start and stop said vertical drive means and said horizontal drive means, (f) wherein said control means actuates said depthwise drive means, after said horizontal drive means and said vertical drive means are stopped, to move said grip means toward said article, (g) wherein said grip means includes: a pair of hands; hand drive means for opening/closing said paired hands; and sensor means for detecting the entrance of said article into between said paired hands, whereby when said sensor means detects the entrance of said article into between said paired hands, it sends its detection signal to said control means so that said control means stops the actuation of said depthwise drive means and actuates said hand drive means to close said paired hands, and (h) wherein said control means actuates, with said paired hands being closed, said drive means to return said grip means to said home position and actuates said hand drive means to open said paired hands.

20. A game machine according to claim 19, wherein the grip means is attached to said horizontal drive means, further comprising:

bias means for biasing said grip means forward while it is attached to the front portion of said horizontal drive means such that said grip means can freely move in the horizontal direction; and sensor means disposed on one of said depthwise drive means and said grip means for detecting the backward movement, if any, of said grip means against the elasticity of said bias means, while said grip means is being moved toward said article by the actuation of said depthwise drive means, to send a signal to said control means thereby to stop the actuation of said depthwise drive means.

* * * * *

UNITED STATES PATENT AND TRADEMARK OFFICE
CERTIFICATE OF CORRECTION

PATENT NO.   : 5,558,340
DATED        : September 24, 1996
INVENTOR(S)  : Takaya IBE et al.

Figure 4:
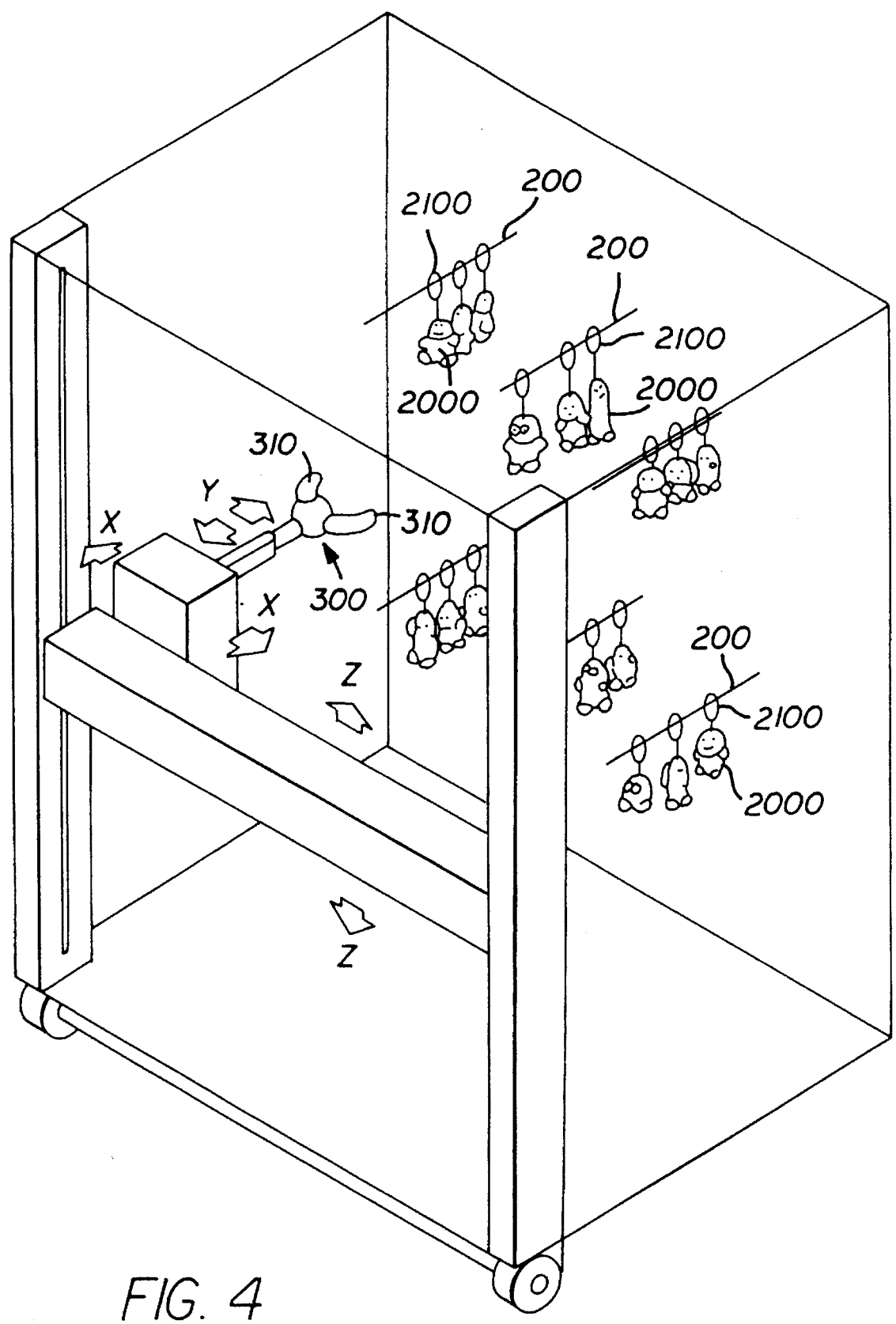
FIG. 4 is a view illustrating of grip means of the embodiment.

It is certified that error appears in the above-indentified patent and that said Letters Patent is hereby corrected as shown below:

In the drawings, Figure 4 which appears as

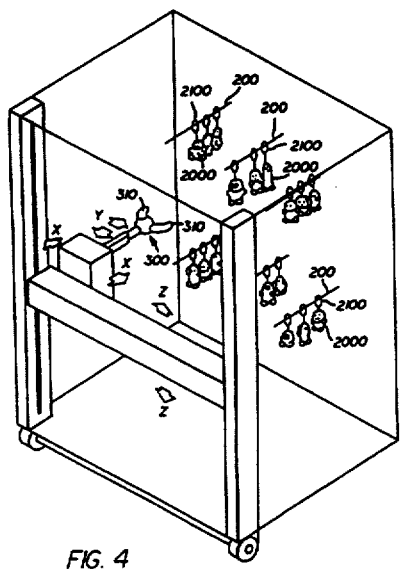

FIG. 4 should appear as

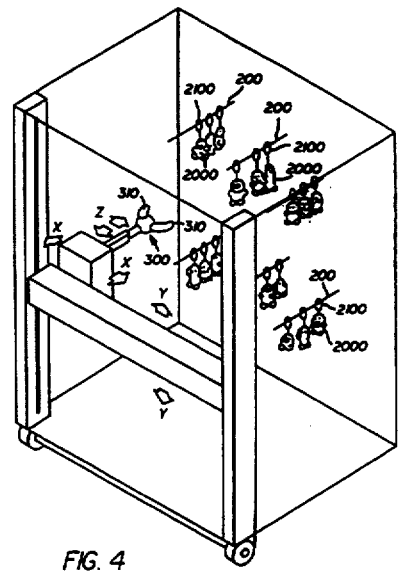

FIG. 4

Signed and Sealed this

Eighteenth Day of February, 1997

Attest:

*Bruce Lehman*

BRUCE LEHMAN

*Attesting Officer*   *Commissioner of Patents and Trademarks*